United States Patent
Nitta et al.

(10) Patent No.: US 12,365,020 B2
(45) Date of Patent: Jul. 22, 2025

(54) METHOD FOR PRODUCING BLANK, METHOD FOR PRODUCING PRESS-FORMED PART, METHOD FOR JUDGING SHAPE, PROGRAM FOR JUDGING SHAPE, APPARATUS FOR PRODUCING BLANK, AND BLANK

(71) Applicant: NIPPON STEEL CORPORATION, Tokyo (JP)

(72) Inventors: Jun Nitta, Tokyo (JP); Takashi Yasutomi, Tokyo (JP); Ryo Tabata, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 833 days.

(21) Appl. No.: 17/626,321

(22) PCT Filed: Jul. 10, 2020

(86) PCT No.: PCT/JP2020/027152
§ 371 (c)(1),
(2) Date: Jan. 11, 2022

(87) PCT Pub. No.: WO2021/010352
PCT Pub. Date: Jan. 21, 2021

(65) Prior Publication Data
US 2022/0241838 A1    Aug. 4, 2022

(30) Foreign Application Priority Data
Jul. 12, 2019   (JP) .............................. 2019-130421

(51) Int. Cl.
*B21D 28/34* (2006.01)
*B21D 28/14* (2006.01)
(Continued)

(52) U.S. Cl.
CPC ............. *B21D 28/34* (2013.01); *B21D 28/14* (2013.01); *B23D 15/08* (2013.01); *G05B 19/401* (2013.01); *G05B 19/40932* (2013.01)

(58) Field of Classification Search
CPC ...................... G05B 19/401; G05B 19/40932; B21D 28/34; B21D 28/14; B21D 28/16; B21D 28/02; B23D 15/08; B23D 35/001
See application file for complete search history.

(56) References Cited

U.S. PATENT DOCUMENTS

| 4,362,078 A | 12/1982 | Ohnishi et al. |
| 2017/0008573 A1* | 1/2017 | Otsuka .................. B62D 25/20 |

(Continued)

FOREIGN PATENT DOCUMENTS

| JP | 3-18918 U | 2/1991 |
| JP | 2002-120025 A | 4/2002 |

(Continued)

OTHER PUBLICATIONS

Milan Blagojevic, "Registration and Surface Inspection of Automotive Pressed Parts Based on Point Cloud Generated by Optical Measuring Techniques", Dec. 2017, Research Gate, Mobility and Vehicle Mechanics (Year: 2017).*

(Continued)

*Primary Examiner* — Christopher W Carter
(74) *Attorney, Agent, or Firm* — Birch, Stewart, Kolasch & Birch, LLP

(57) ABSTRACT

The present invention has as its technical problem to provide a punching method able to stably secure a stretch-flange-ability equal to or greater than the case of using a punch having a flat blade at its bottom surface. The punching method of the present invention is a method of punching a metal sheet using a punching and shearing device provided with a punch having an upper blade having a horizontal part (Continued)

with respect to the cutting line in part and having parts other than the horizontal part comprised of inclined parts and a die having a lower blade wherein the upper blade used for the punching process has a shape where the inclined parts first contact the metal sheet at the time of a punching process.

14 Claims, 17 Drawing Sheets

(51) Int. Cl.
  *B23D 15/08* (2006.01)
  *G05B 19/401* (2006.01)
  *G05B 19/4093* (2006.01)

(56) References Cited

U.S. PATENT DOCUMENTS

| | | | |
|---|---|---|---|
| 2018/0136100 A1* | 5/2018 | Nitta | G01N 3/28 |
| 2018/0272408 A1 | 9/2018 | Yasutomi et al. | |
| 2019/0240715 A1 | 8/2019 | Yasutomi et al. | |
| 2020/0038931 A1 | 2/2020 | Miyagi et al. | |
| 2020/0276658 A1 | 9/2020 | Fujii et al. | |

FOREIGN PATENT DOCUMENTS

| | | |
|---|---|---|
| JP | 2010-36195 A | 2/2010 |
| JP | 5042935 B2 | 10/2012 |
| JP | 5042936 B2 | 10/2012 |
| KR | 10-1908641 B1 | 12/2018 |
| WO | WO 2017/057466 A1 | 4/2017 |
| WO | WO 2018/043730 A1 | 3/2018 |
| WO | WO 2018/066663 A1 | 4/2018 |
| WO | WO 2019/064922 A1 | 4/2019 |

OTHER PUBLICATIONS

Cheol Jo Hyeon, "A liDAR Point Cloud Data-Based Method for Evaluating Strain on a Curved Steel Plate Subjected to Lateral Pressure", Dec. 2019, MDPI, Sensors 2020, 20, 721 (Year: 2019).*

Qiang Yu, "Precise die face design of drawing dies for stamping process based on point cloud", 2014, Applied Mechanics and Materials, ISSN: 1662-7482, vols. 490-491, pp. 302-305, Trans Tech Publications Ltd, (Year: 2014).*

* cited by examiner

FIG. 6
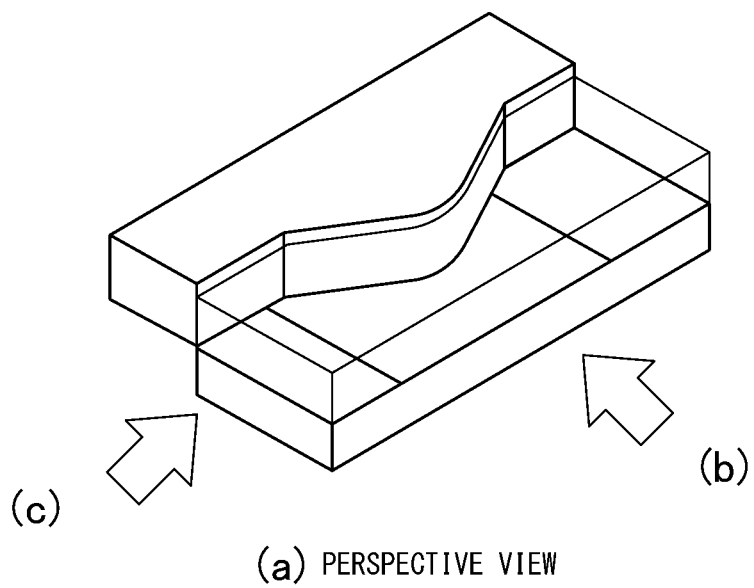
(a) PERSPECTIVE VIEW
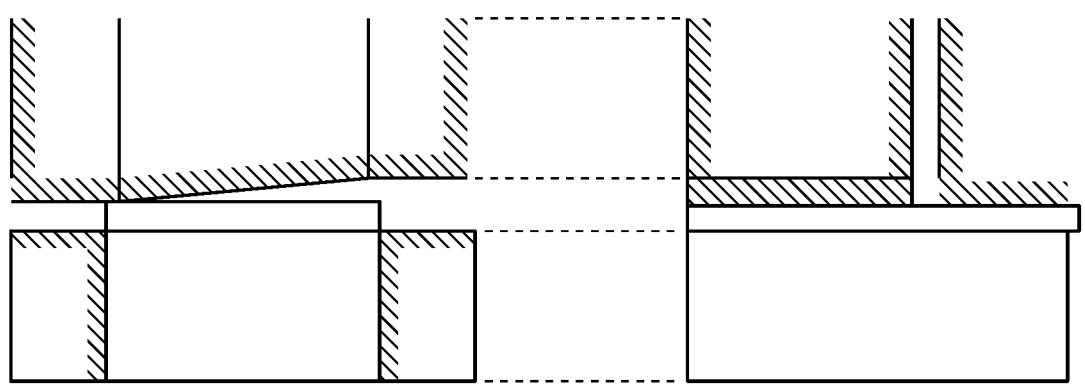
(b) FRONT VIEW          (c) SIDE VIEW

FIG. 9
BEFORE FLANGE FORMATION
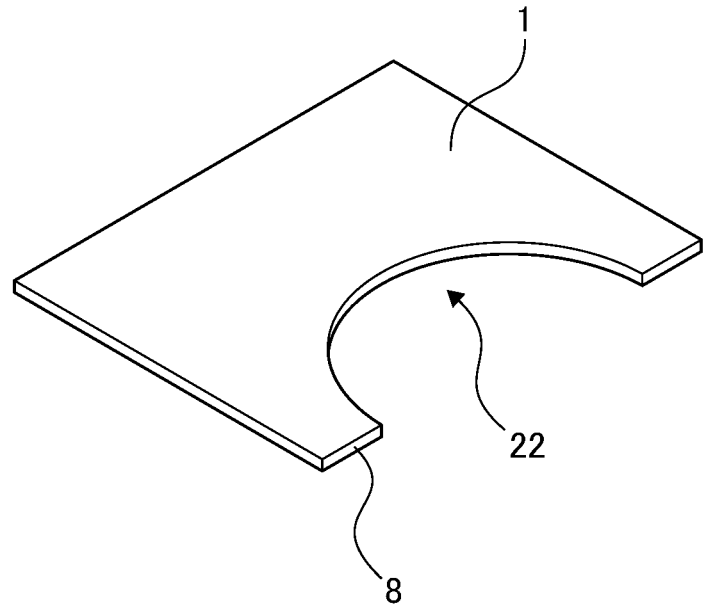
(a)
AFTER FLANGE FORMATION
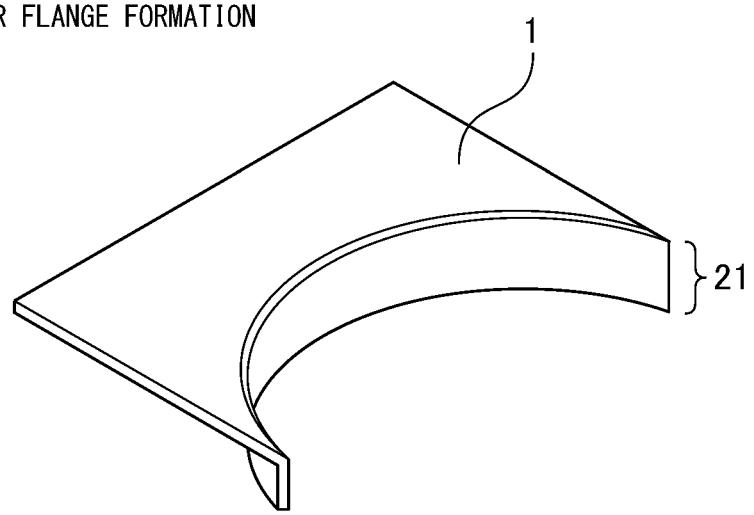
(b)

FIG. 12
(a)
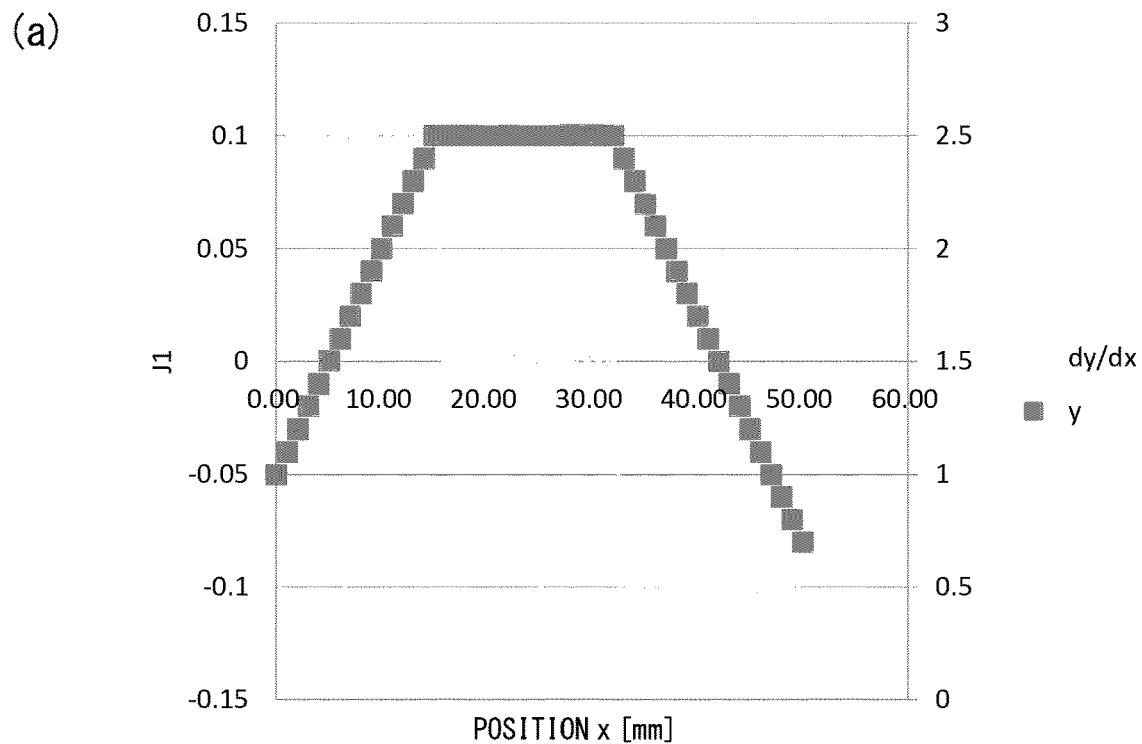
(b)
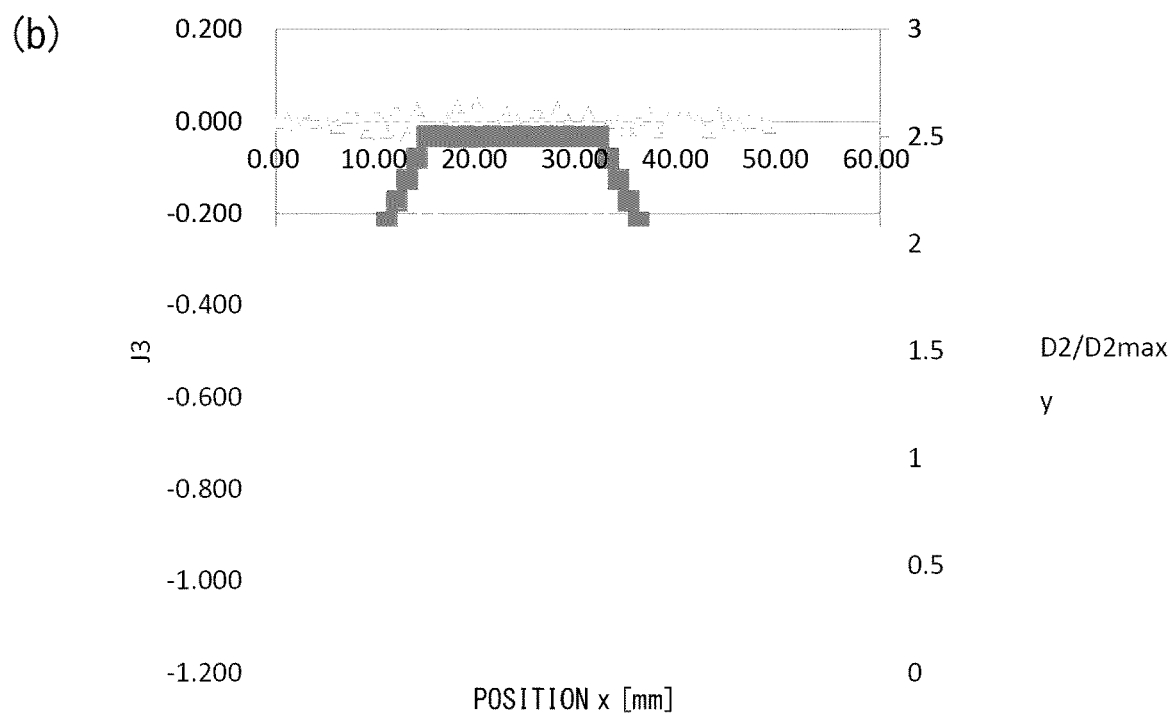

FIG. 13
(a)
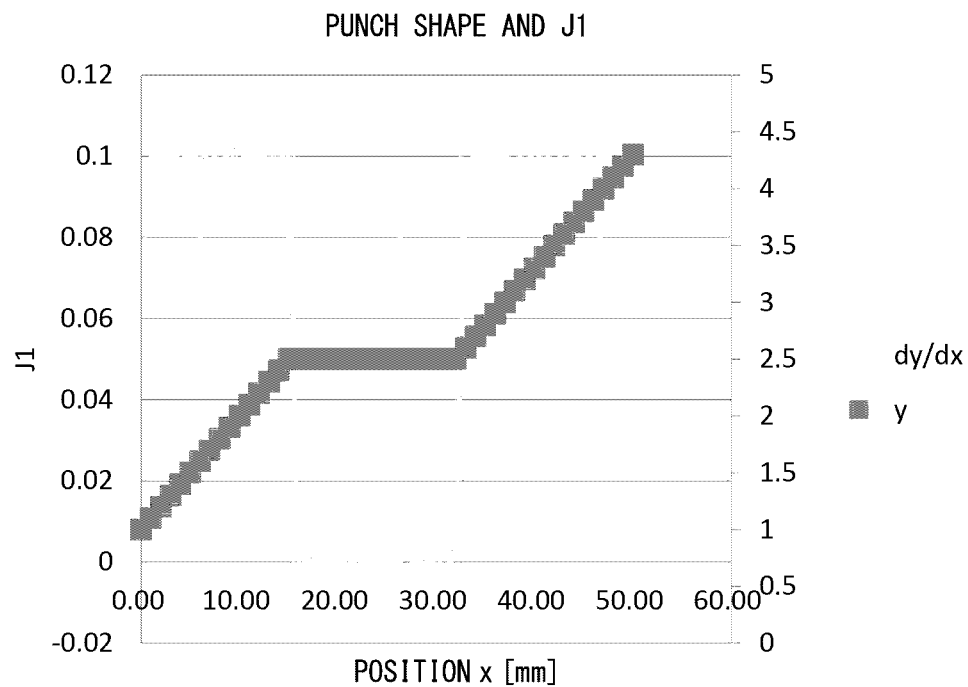
(b)
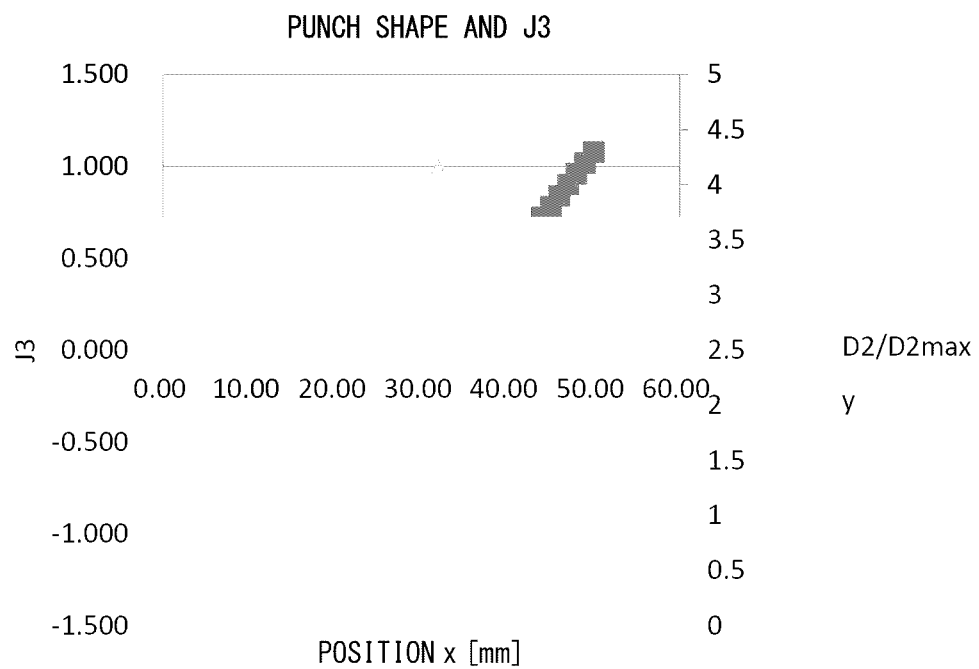

FIG. 14
(a)
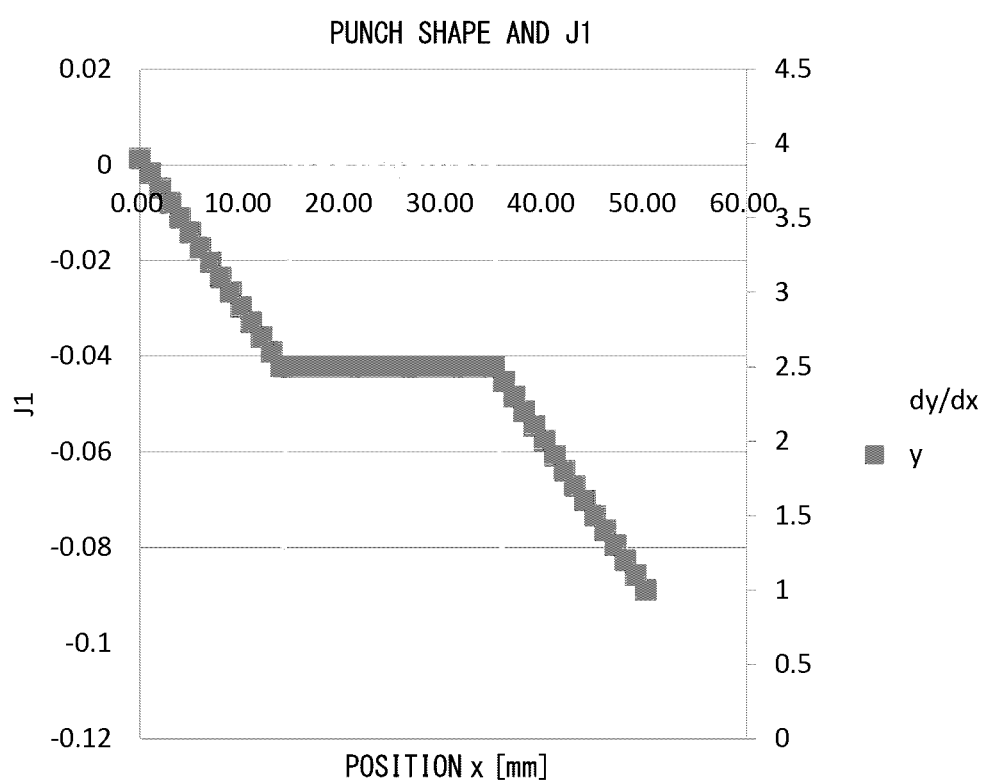
(b)
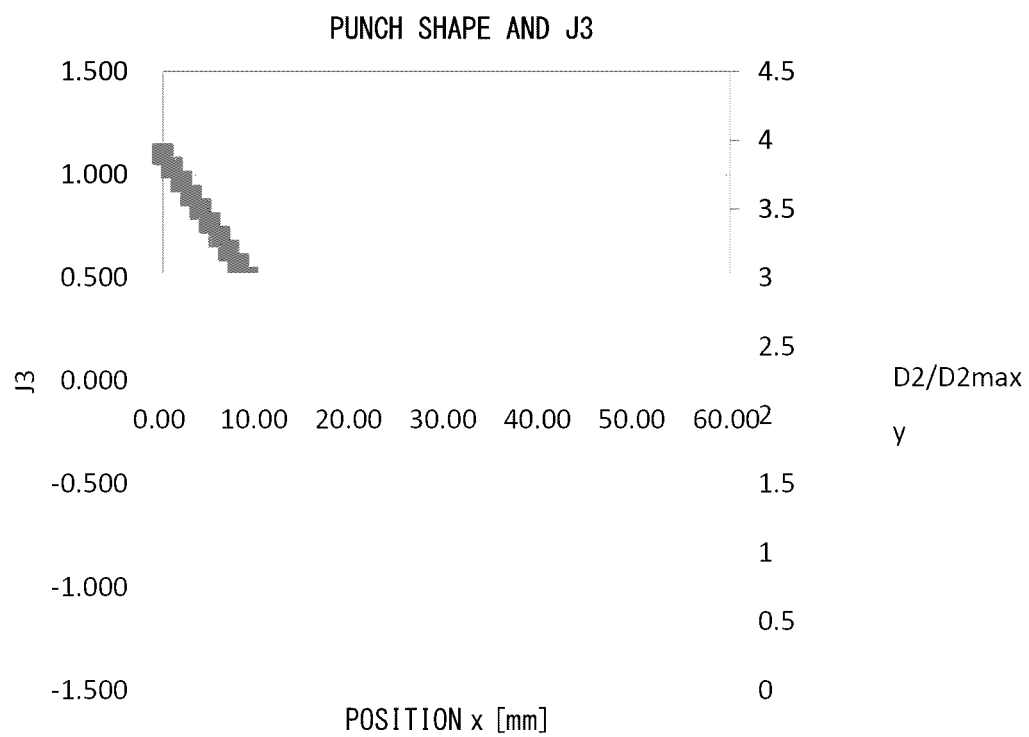

FIG. 15
(a)
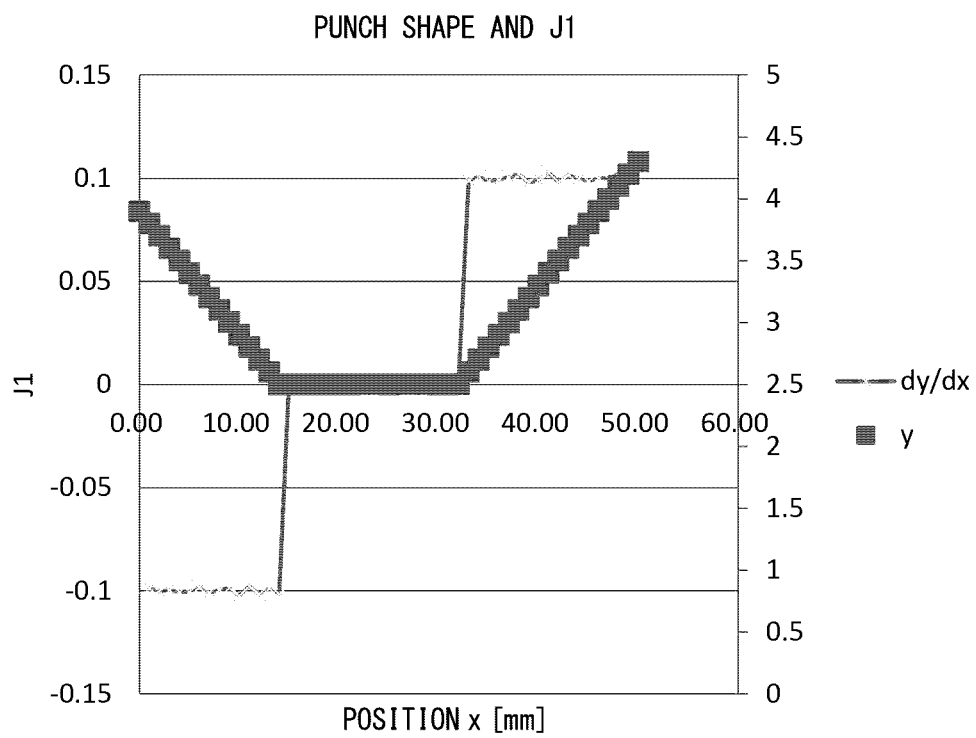
(b)
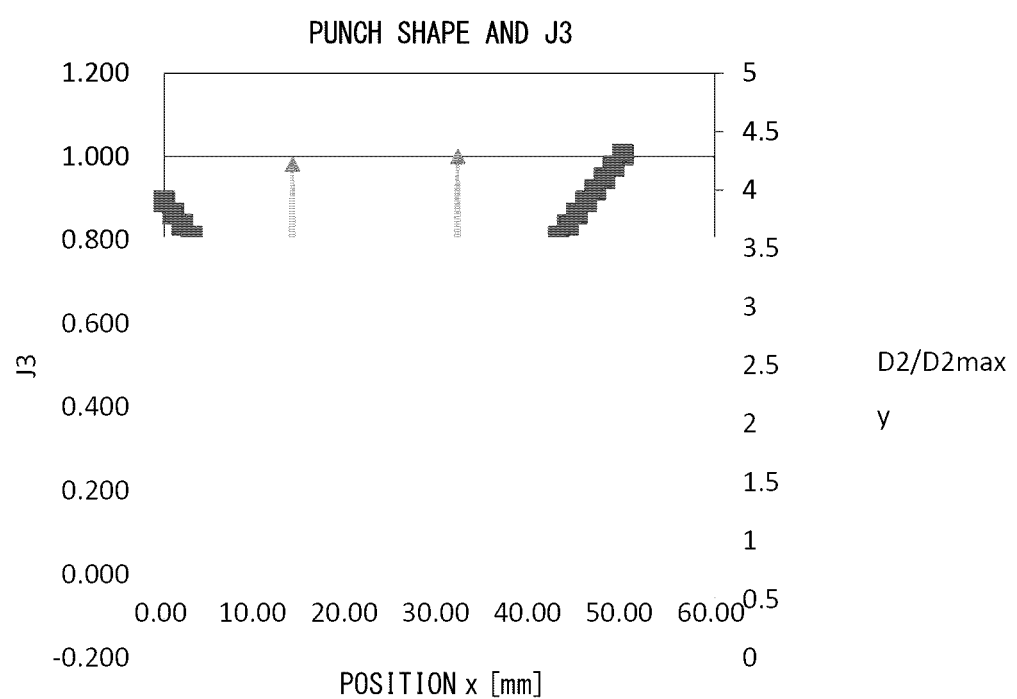

FIG. 16
(a)
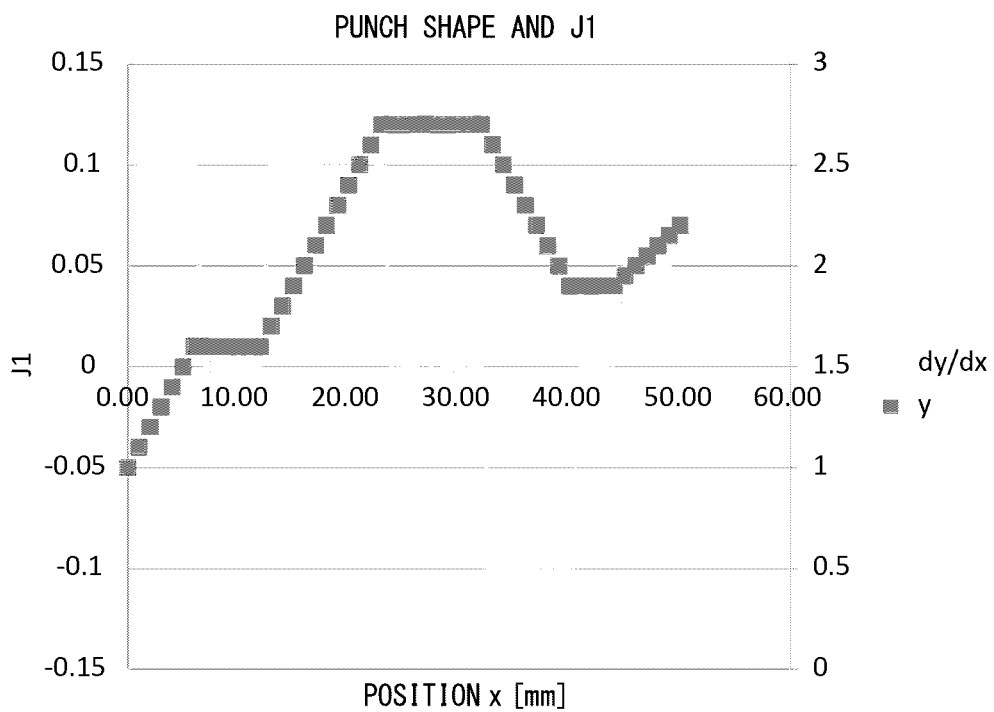
(b)
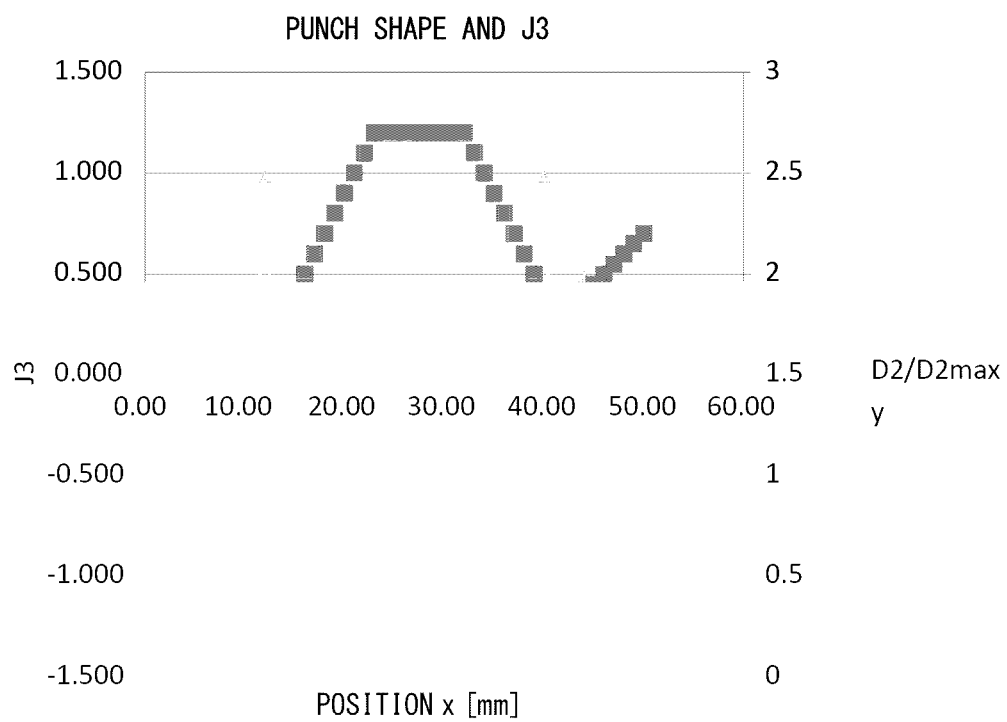

METHOD FOR PRODUCING BLANK, METHOD FOR PRODUCING PRESS-FORMED PART, METHOD FOR JUDGING SHAPE, PROGRAM FOR JUDGING SHAPE, APPARATUS FOR PRODUCING BLANK, AND BLANK

FIELD

The present invention relates to a method for producing a blank and a method for producing a press-formed part in which metal sheets of iron, aluminum, titanium, magnesium, and their alloys etc. for use in automobiles, household electric appliances, building structures, ships, bridges, construction machinery, various plants, penstocks, etc. are punched by a punching and shearing device with shear angle and then press-form them, more particularly relates to a method for producing a blank, a method for judging shape, a program for judging shape, an apparatus for producing a blank, and a blank.

BACKGROUND

The metal sheets for use in automobiles, household electric appliances, building structures, etc. (below, referred to as "workpieces 1") are often punched by placing a workpiece 1 on a die (also referred to as a "die") 3 such as shown in FIG. 1, then pressing down a punch 2 (also referred to as a "punch") in the arrow direction shown in FIG. 1 to thereby punch the workpiece 1.

As shown in FIG. 2, after being punched, the punched surface 8 of the workpiece 1 is comprised of a shear droop 4 formed by the workpiece 1 being pushed in overall by the punch 2, a shear surface 5 formed by the workpiece 1 being drawn into the clearance between the punch 2 and the die 3 (below, when indicating "clearance" without any particular explanation, indicating the clearance between the punch and die) and being locally drawn, a fracture surface 6 formed by the workpiece 1 drawn into the clearance between the punch 2 and the die 3 fracturing, and a burr 7 formed at the back surface of the workpiece 1.

Usually, in such a punching process, to reduce the punching load required for punching the workpiece 1 and the noise generated at the time of punching the workpiece 1, a punch 2 such as shown in FIG. 3 having at its bottom surface an upper blade 10 inclined with respect to a width direction of the workpiece 1, that is, a cutting line direction of the workpiece 1 (also referred to as the "punching direction") (in the case of FIG. 3, an inclined blade) is used. Since the upper blade 10 is inclined in the cutting line direction, this punch 2 can locally apply the punching load to the workpiece 1 and successively cut the workpiece 1 from one end side positioned in the width direction to the other end side. Due to this, the punching load is reduced.

However, if using a punch 2 having such an inclined blade 10 at the bottom surface, the stretch-flangeability becomes inferior to that of a workpiece 1 punched by a punch 2 having a flat bottom surface. This is believed to be because the workpiece 1 flexes in the width direction since the workpiece 1 is successively cut along the width direction by the inclined blade 10 and because at the time of punching, the workpiece 1 excessively bends toward the longitudinal direction and the punched surface 8 becomes greater in work hardening and roughness in the end face properties compared with when using a punch 2 having a flat bottom surface.

PTLs 1 and 2 disclose a punching and shearing device with shear angle able to secure a stretch-flangeability equal to or greater than the case of using a punch having a flat blade at the bottom surface when punching and shearing by a punch having an inclined blade at its bottom surface capable of reducing the punching load and noise.

Specifically, PTL 1 discloses a punching and shearing device with shear angle provided with a punch having an upper blade inclined with respect to the cutting direction and a die having a lower blade wherein after cutting part of the workpiece, a partial sheet reverse holder holding down the workpiece is provided at a position facing the punch, the partial sheet reverse holder being an inclined partial sheet reverse holder with an angle of inclination in the cutting line direction equal to the angle of inclination of the cutting direction of the punch.

PTL 2, as shown in FIG. 4, discloses a punching and shearing device with shear angle provided with a punch having an upper blade comprised of a horizontal part at part in the cutting line direction and inclined parts at the parts other than the horizontal part and with a die having a lower blade, wherein the horizontal part of the upper blade is arranged above part or all of the scheduled stretch flange part in the forming process after cutting the workpiece.

PTL 3 discloses a punching method for punching a workpiece using a punch having at the cutting edge a recessed part formed in a recessed shape in a cross-section parallel to the punching direction by a straight or curved shaped shear angle and a die.

PTL 4 discloses a method of cutting a workpiece having a weld zone and a heat affected zone around it by shearing using a punch having a flat part and a projecting part projecting out toward the workpiece side from the flat part, positioning the workpiece with respect to the punch at a position where the shearing of at least one of the heat affected zone or weld zone by the projecting part will be started before shearing of the workpiece by the flat part, and making the punch and die move relatively in that positioned state so as to traverse the weld zone at the workpiece.

CITATIONS LIST

Patent Literature

[PTL 1] Japanese Patent No. 5042935
[PTL 2] Japanese Patent No. 5042936
[PTL 3] Japanese Unexamined Patent Publication No. 2010-36195
[PTL 4] WO2017/057466

SUMMARY

Technical Problem

According to the methods of the above PTLs 1 to 4, in punching and shearing by a punch having an inclined blade at its bottom surface, it is possible to secure a stretch-flangeability equal to or greater than the case of using a punch having a flat blade at its bottom surface.

However, as a result of study by the inventors, it was learned that while processing a large number of pieces, sometimes the stretch-flangeability would drop and sometimes would become unstable.

The present invention was made in consideration of the above-mentioned problem and has as its technical problem to provide a punching method, a method for producing a press-formed part, a program for judging the shape of an upper blade, and a method for correcting a shear angle able to stably secure a stretch-flangeability equal to or greater than the case of using a punch having a flat blade at its bottom surface during punching and shearing by a punch having an inclined blade at its bottom surface able to reduce the punching load and noise.

Solution to Problem

The inventors engaged in intensive studies and as a result learned that the drop or fluctuation of the stretch-flangeability is influenced by the shape of the shear angle part. The shape of the shear angle part giving a good stretch-flangeability and the shape of the shear angle part where a drop or fluctuation of the stretch-flangeability is seen is a difference of an extent hard to visually judge, but it was learned that by differentiating between these in advance, a good stretch-flangeability can be stably obtained.

The present invention was made after further study and has as its gist the following:

(1) A method for producing a blank comprising by using a punching and shearing device having a punch having an upper blade and a die having a lower blade, punching a metal sheet placed between the punch and the die, the upper blade comprising a first inclined part, second inclined part, and third inclined part provided in that order in a cutting line direction of the metal sheet, an angle $\theta_1$ of the first inclined part with respect to the metal sheet in the cutting line direction, an angle $\theta_2$ of the second inclined part with respect to the metal sheet in the cutting line direction, and an angle $\theta_3$ of the third inclined part with respect to the metal sheet in the cutting line direction satisfying $\theta_2 \leq \theta_1/2$ and $\theta_2 \leq \theta_3/2$, and at the time of the punching, the first inclined part and the third inclined part contacting the metal sheet, then the second inclined part contacting the metal sheet, wherein, in a point cloud $(x_n, y_n)$ of the shape of the upper blade comprising sets of cutting line direction positions $(x_n)$ and displacements $(y_n)$ of the upper blade along the direction of movement of the punch corresponding to the $x_n$ in a direction away from the metal sheet, a second order difference quotient $J2_n=(y_{n+1}-2y_n+y_{n-1})/(\Delta x)^2$ a maximum value $J2_{max}$ of the second order difference quotient, and $J3_n=J2_n/|J_{2\ max}|$ are defined, a first point where an absolute value of $J3_n$ becomes a predetermined threshold value $\delta_2$ or more is a boundary position of the first inclined part and the second inclined part, and a last point is a boundary position of the second inclined part and the third inclined part, and $\theta_1$, $\theta_2$, and $\theta_3$ mean respectively the average values of the maximum values and minimum values of the angles formed with the metal sheet by tangents at any points of the first inclined part, the second inclined part, and the third inclined part.

(2) The method for producing a blank according to (1), wherein the angle $\theta_2$ of second inclined part with respect to the metal sheet in the cutting line direction satisfies $\theta_2 \leq 3.0°$.

(3) The method for producing a blank according to (1) or (2), wherein the method comprises before the punching, a step of judging a shape of the upper blade before stamping and a step of adjusting a shear angle of the upper blade based on the result of judgment of the shape of the upper blade.

(4) A method for producing a press-formed part comprising press-forming a blank obtained by the method according to any one of (1) to (3) to obtain a press-formed part.

(5) A method for judging a shape of an upper blade used in the method according to (3), the method for judging a shape comprising a step of inputting a point cloud $(x_n,y_n)$ of the shape of the upper blade comprised of sets of cutting line direction positions $(x_n)$ and displacements $(y_n)$ of the upper blade along the direction of movement of the punch corresponding to the $x_n$ in a direction away from the metal sheet, a step of calculating a first-order difference quotient $J1_n=(y_{n+1}-y_n)/\Delta x$ for the input point cloud $(x_n, y_n)$, a step of calculating a second order difference quotient $J2_n=(y_{n+1}-2y_n+y_{n-1})/(\Delta x)^2$, a step of calculating a maximum value $J2_{max}$ of the second order difference quotient, a step of calculating a type judgment value $J3_n=J2_n/|J_{2\ max}|$, and a step of judging it is necessary to adjust a shear angle of the upper blade if an absolute value $J3_n$ is a predetermined threshold value $\delta_2$ or more and $J3_n$ is positive at one or both of a boundary of the second inclined part and the first inclined part and a boundary of the second inclined part and the third inclined part.

(6) A program for judging a shape of an upper blade used in the method according to (3), the program executing a step of inputting a point cloud $(x_n, y_n)$ of the shape of the upper blade comprised of sets of cutting line direction positions $(x_n)$ and displacements $(y_n)$ of the upper blade along the direction of movement of the punch corresponding to the $x_n$ in a direction away from the metal sheet, a step of calculating a first-order difference quotient $J1_n=(y_{n+1}-y_n)/\Delta x$ for the input point cloud $(x_n, y_n)$, a step of calculating a second order difference quotient $J2_n=(y_{n+1}-2y_n+y_{n-1})/(\Delta x)^2$, a step of calculating a maximum value $J2_{max}$ of the second order difference quotient, a step of calculating a type judgment value $J3_n=J2_n/|J_{2\ max}|$, and a step of judging it is necessary to adjust a shear angle of the upper blade if an absolute value $J3_n$ is a predetermined threshold value $\delta_2$ or more and $J3_n$ is positive at one or both of a boundary of the second inclined part and the first inclined part and a boundary of the second inclined part and the third inclined part.

(7) An apparatus for producing a blank used in the method according to (3), the apparatus comprising an input unit for inputting a point cloud $(x_n, y_n)$ of the shape of the upper blade comprised of sets of cutting line direction positions $(x_n)$ and displacements $(y_n)$ of the upper blade along the direction of movement of the punch corresponding to the $x_n$ in a direction away from the metal sheet, a first calculating part for calculating a first-order difference quotient $J1_n=(y_{n+1}-y_n)/\Delta x$ for the input point cloud $(x_n, y_n)$, a second calculating part for calculating a second order difference quotient $J2_n=(y_{n+1}-2y_n+y_{n-1})/(\Delta x)^2$, a third calculating part for calculating a maximum value $J2_{max}$ of the second order difference quotient, a fourth calculating part for calculating a type judgment value $J3_n=J2_n/|J_{2\ max}|$, and a judging part for judging it is necessary to adjust a shear angle of the upper blade if an absolute value $J3_n$ is a predetermined threshold value $\delta_2$ or more and $J3_n$ is positive at one or both of a boundary of the second inclined part and the first inclined part and a boundary of the second inclined part and the third inclined part.

(8) A blank having a sheared end face comprising a region A of a width of 5 mm surrounded by two vertical lines drawn in the thickness direction in the sheared end face, the area ratio of the secondary sheared surface at that region A being $A_2/2$ or less, the radius of curvature of the region A in a top view being ½ or less of R, wherein $A_2$ means an area ratio of a secondary sheared surface of an entire range of a sheared end face, and R means a center value of a radius of curvature of an entire range of a blank line in a top view.

(9) The blank according to (8), wherein the area ratio of the sheared surface at the region A is not more than 80% of the area ratio of the sheared end face at the region excluding the region A from the entire range of the sheared end face.

(10) The blank according to (8) or (9), wherein a change in the area ratio of the sheared surface in the sheet width direction of the region A is within ±20%.

Advantageous Effects of Invention

According to the present invention, in punching and shearing by a punch having an inclined blade at its bottom surface able to reduce the punching load and noise, it is possible to stably secure a stretch-flangeability equal to or greater than the case of using a punch having a flat blade at its bottom surface.

BRIEF DESCRIPTION OF DRAWINGS

FIG. 6 gives views showing the configuration of a drum type stretch flange test die used in the study of the present invention, wherein (a) is a perspective view, (b) is a front view, and (c) is a side view.

FIG. 9 gives views schematically showing an example of a stretch flange part, wherein (a) is a view showing a blank (workpiece) before formation of a flange and (b) is a view showing a member after formation of a flange.

FIG. 12 is an example of judgment of a type of shape of a punch from 2D shape data of the punch in the present invention.

FIG. 13 is an example of judgment of a type of shape of a punch from 2D shape data of the punch in the present invention.

FIG. 14 is an example of judgment of a type of shape of a punch from 2D shape data of the punch in the present invention.

FIG. 15 is an example of judgment of a type of shape of a punch from 2D shape data of the punch in the present invention.

FIG. 16 is an example of judgment of a type of shape of a punch from 2D shape data of the punch in the present invention.

DESCRIPTION OF EMBODIMENTS

First, the details of the study conducted by the inventors leading to completion of the present invention will be explained.

Figure 5:
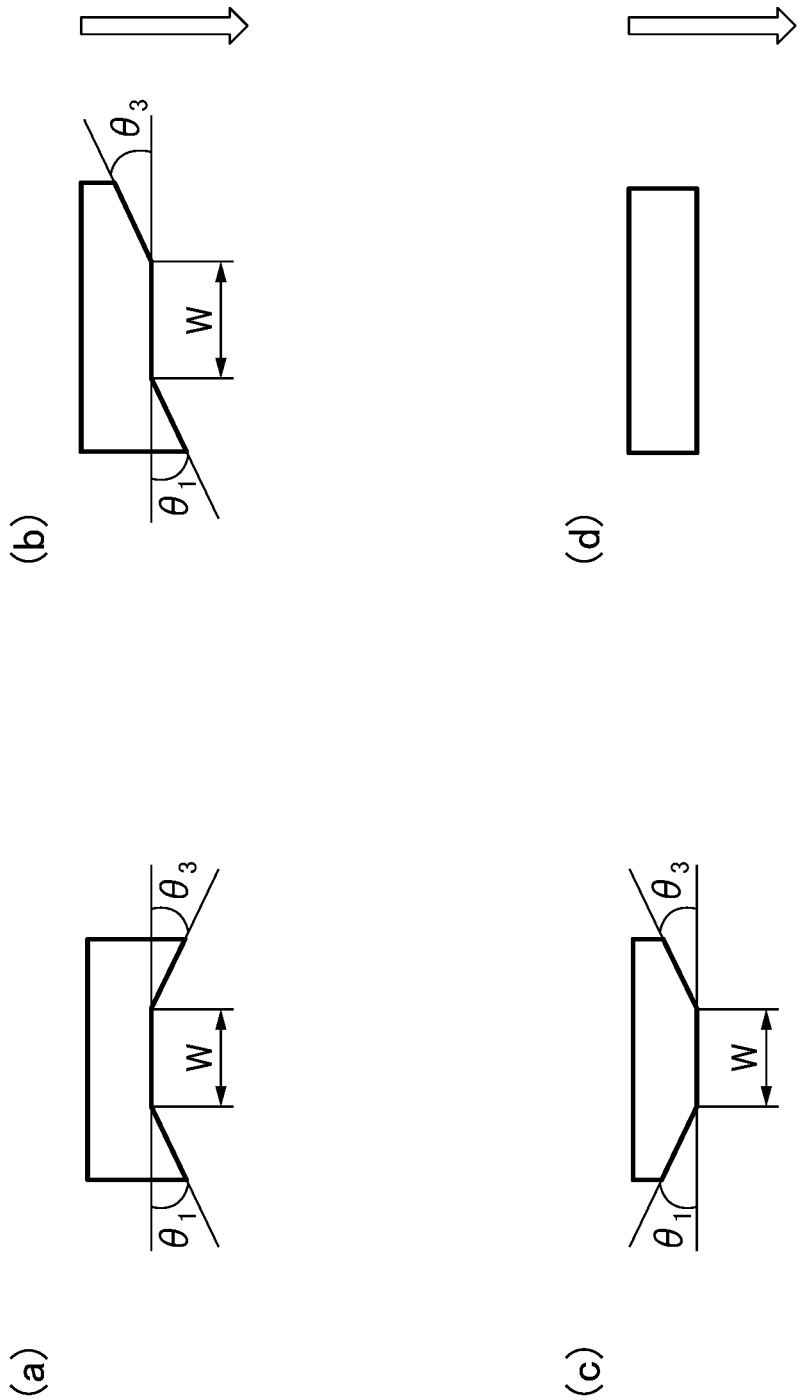
FIG. 5 gives views showing shapes of punches with shear angles used in the study of the present invention.

The inventors intensively studied the relationship between four patterns of shapes of punches shown in FIG. 5 and the stretch-flangeability of a punched surface 8 for a workpiece 1 punched by a punch 2.

FIG. 5 shows shapes of punches when viewed from the front. (a) to (c) show inclined blades having a first inclined part, second inclined part, and third inclined part in that order in the cutting line direction. The first inclined part forms an angle $\theta_1$ with the metal sheet in the cutting line direction, the second inclined part forms an angle $\theta_2$ with the metal sheet in the cutting line direction, and the third inclined part forms an angle $\theta_3$ with the metal sheet in the cutting line direction.

Here, in a point cloud $(x_n, y_n)$ of the shape of the upper blade comprised of sets of cutting line direction positions $(x_n)$ and displacements $(y_n)$ of the upper blade along the direction of movement of the punch corresponding to the $x_n$ in a direction away from the metal sheet, a second order difference quotient $J2_n=(y_{n+1}-2y_n+y_{n-1})/(\Delta x)^2$, a maximum value $J2_{max}$ of the second order difference quotient, and $J3_n=J2_n|J2_{max}|$ are defined, a first point where an absolute value of $J3_n$ becomes a predetermined threshold value $\delta_2$ or more is a boundary position of the first inclined part and the second inclined part, and a last point is a boundary position of the second inclined part and the third inclined part.

Further, $\theta_1$, $\theta_2$, and $\theta_3$ are respectively the average values of the maximum values and minimum values of the angles formed with the metal sheet by tangents at any points of the first inclined part, the second inclined part, and the third inclined part. In the examples of FIG. 5, the first inclined part, second inclined part, and third inclined part are shaped straight in the cutting line directions. The angles with the metal sheet which any tangents in the cutting line directions form at the inclined parts are constant. Further, in the examples of FIG. 5, $\theta_1=\theta_3$ and $\theta_2=0.0°$.

(a) shows a shape with a horizontal part provided between the R shear angle part and reverse shear angle part therefore a shape where the shear angle parts first penetrate the workpiece and the center horizontal part finally penetrates it (below, referred to as "TYPE-A"). (b) shows a shape where a horizontal part is provided at part of a shear angle part inclined in one direction therefore a shape where one of the shear angle parts first penetrates the workpiece, then the center part and after that the other shear angle part penetrate the workpiece (below, referred to as "TYPE-B"). (c) shows a shape where a horizontal part is provided at a wedge therefore a shape where the center horizontal part first penetrates the workpiece and finally the shear angle part penetrates it (below, referred to as "TYPE-C"). (d) shows a flat blade with no inclined parts (below, referred to as "TYPE-1").

For TYPE-A, TYPE-B, and TYPE-C, further, four types of punches changed in widths of horizontal parts and shear angles were prepared.

Figure 7:
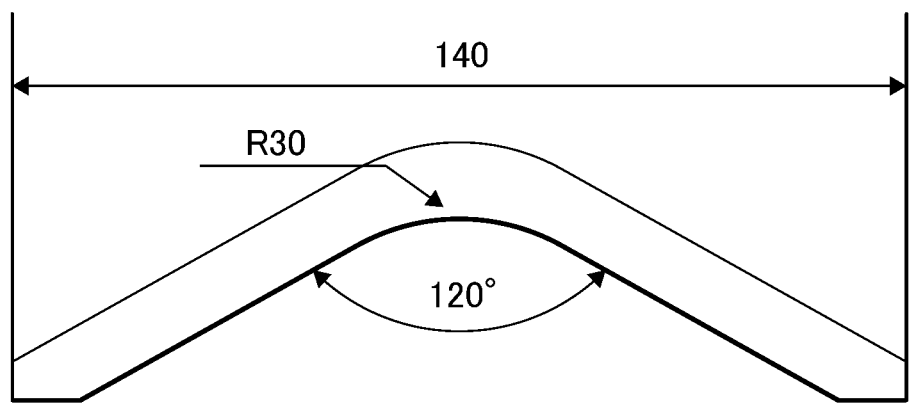
FIG. 7 is a view showing a shape of a punched part used in the study of the present invention.

These shapes of punches were used for punching using the drum type stretch flange test die shown in FIG. 6. The blank lines, as shown in FIG. 7, seen from a top view, are the same with R30 mm and an opening angle of θ120°. Only the punches were changed and the patterns of shear angle parts and horizontal parts were changed. The punches were arranged so that at the time of the punching process, the center positions of the second inclined parts of the punches in the cutting line directions became positions corresponding to the center positions of the blank lines.

The 13 types of drum type test punches shown in Table 1 were prepared and used for punching processes in a 60 ton crank press. The test materials were made thickness 1.4 mm JSC980Y and the punching clearances were made constant ones of 12.6% of the sheet thicknesses of the workpieces.

After punching, the samples were subjected to side bend tests to investigate the fracture limit strains. Each sample was tested twice. The results are shown in Table 1.

TABLE 1

| Name of shape of punch | Width "w" of second inclined part [mm] | $\theta_1$ ($\theta_3$) [°] | $\theta_2$ [°] | Fracture limit strain |
|---|---|---|---|---|
| TYPE-1 | — | 0.0 | 0.0 | 0.23 |
|  |  |  |  | 0.22 |
| TYPE-A-1 | 20.0 | 0.5 | 0.0 | 0.24 |
|  |  |  |  | 0.25 |
| TYPE-A-2 | 20.0 | 1.0 | 0.0 | 0.26 |
|  |  |  |  | 0.26 |
| TYPE-A-3 | 40.0 | 0.5 | 0.0 | 0.24 |
|  |  |  |  | 0.26 |
| TYPE-A-4 | 40.0 | 1.0 | 0.0 | 0.26 |
|  |  |  |  | 0.26 |
| TYPE-B-1 | 20.0 | 0.5 | 0.0 | 0.24 |
|  |  |  |  | 0.25 |
| TYPE-B-2 | 20.0 | 1.0 | 0.0 | 0.26 |
|  |  |  |  | 0.24 |
| TYPE-B-3 | 40.0 | 0.5 | 0.0 | 0.25 |
|  |  |  |  | 0.25 |
| TYPE-B-4 | 40.0 | 1.0 | 0.0 | 0.26 |
|  |  |  |  | 0.24 |
| TYPE-C-1 | 20.0 | 0.5 | 0.0 | 0.20 |
|  |  |  |  | 0.22 |
| TYPE-C-2 | 20.0 | 1.0 | 0.0 | 0.19 |
|  |  |  |  | 0.22 |
| TYPE-C-3 | 40.0 | 0.5 | 0.0 | 0.12 |
|  |  |  |  | 0.12 |
| TYPE-C-4 | 40.0 | 1.0 | 0.0 | 0.23 |
|  |  |  |  | 0.22 |

Figure 8:
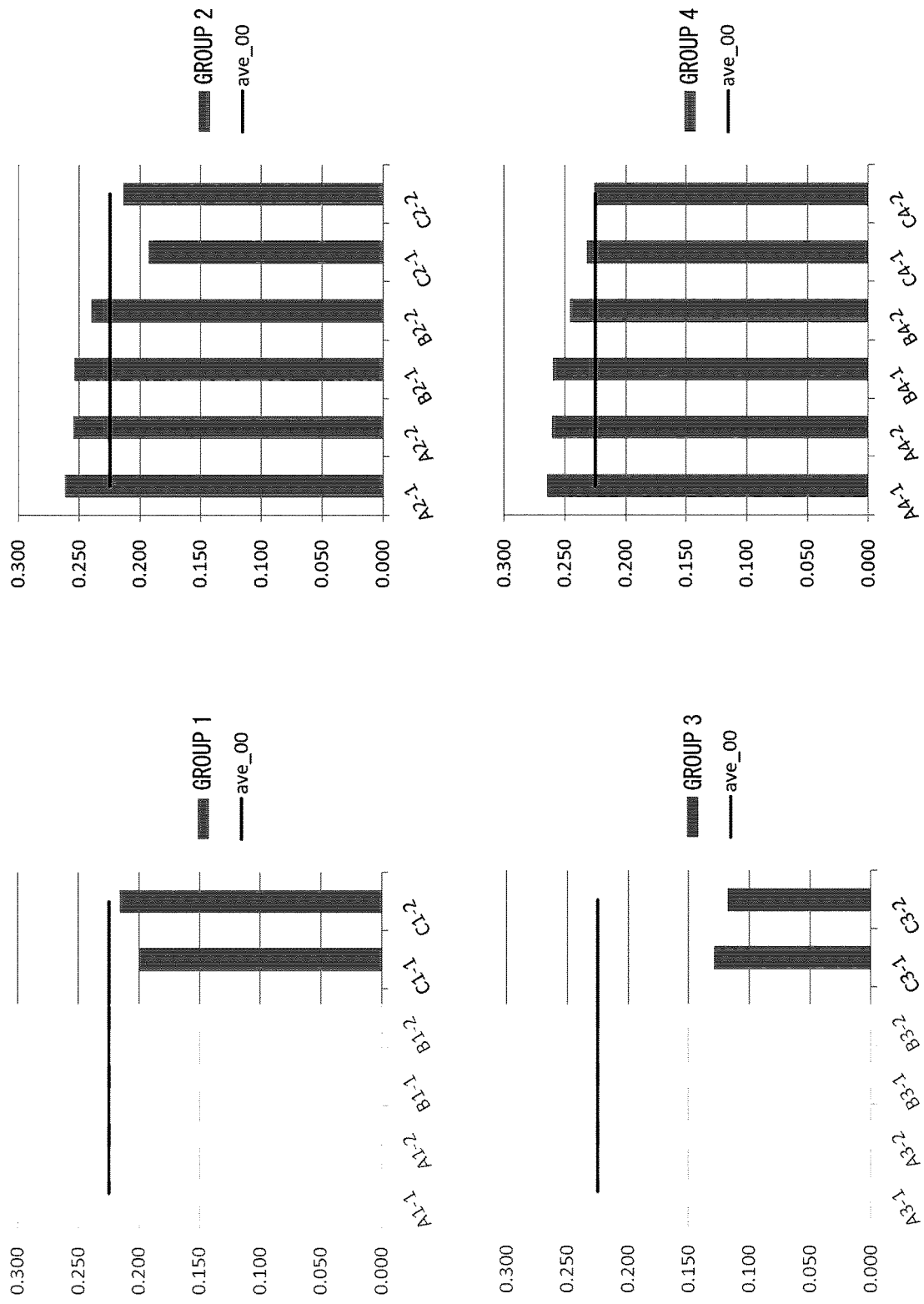
FIG. 8 is a view showing results of a survey of fracture limit strain for samples punched using different shapes of shear angle type punches.

FIG. 8 shows the results of Table 1. Group 1 gives the test results for TYPE-A-1, TYPE-B-1, and TYPE-C-1 of Table 1, Group 2 gives the test results for TYPE-A-2, TYPE-B-2, and TYPE-C-2 of Table 1, Group 3 gives the test results for TYPE-A-3, TYPE-B-3, and TYPE-C-3 of Table 1, and Group 4 gives the test results for TYPE-A-4, TYPE-B-4, TYPE-C-4 of Table 1. The "Xx-y" of the graph abscissas (X is either of A, B, and C and "x", "y" are numerical values) means the y-th test result of TYPE-X-x. The horizontal lines in the graphs are the average value of TYPE-1, while the bars are the two test results for the four types of samples of TYPE-A, TYPE-B, and TYPE-C. The ordinates of the graphs show the fracture limit strain.

The specific method for the side bend test is disclosed in Japanese Unexamined Patent Publication No. 2009-145138.

Specifically, the side bend test machine has a pair of arm parts attached able to pivot at support points of respectively different positions, a pair of holding parts at the front end parts of the arm parts for fastening the top and bottom surfaces of the two end parts of test pieces having marking lines or mark points at their top surfaces or bottom surfaces together with the arm parts, and load applying means for applying loads to the rear ends of the pair of arm parts. The pair of arm parts are configured so that their leg parts cross each other. Further, by applying loads to the rear ends by the load applying means and by the front end parts of the pair of arm parts moving in respectively opposite directions to separate while centered about their respective support points, this has the function of imparting tension and bending deformation to the end faces in the sheet thickness direction at the center parts of the test pieces in the longitudinal direction fastened by the arm parts and holding parts.

Further, using the side bend test machine, the top and bottom surfaces of the two end parts of the test pieces with marking lines or mark points on their top surfaces or bottom surfaces are fastened by the arm parts and holding parts at the front end parts of the pair of arm parts, then loads are applied to the rear ends of the pair of arm parts by the load applying means to impart tension and bending deformation so that the end faces in the sheet thickness direction at the center parts of the test pieces in the longitudinal direction are spread apart. Based on an image obtained by a first observing means stored by a storage means, strain when a crack runs through the end face in the thickness direction of a test piece observed by the first observing means is calculated based on the marking lines or mark points observed by two observing means.

As will be understood from FIG. 8, in the case of the shape of TYPE-C, it was confirmed that the break strain becomes smaller than the case of using a flat blade, that is, the stretch-flangeability sometimes falls. As will be understood from these results, it is possible to avoid a drop in the stretch-flangeability by checking the shape of the upper blade of the punch in advance so as not to perform a punching process by a punch of TYPE-C, that is, a shape of the upper blade of (c), where the horizontal part of the upper blade first penetrates the workpiece.

In other words, it is possible to avoid a drop in the stretch-flangeability by using a punch like TYPE-A or TYPE-B where the inclined parts first penetrate the workpiece. The inclined parts first penetrating the workpiece may be inclined parts at the two sides of a horizontal part like in TYPE-A or may be only an inclined part at one side of a horizontal part like in TYPE-B.

The cause of the drop in the stretch-flangeability in the TYPE-C may be as follows:

When using a punching process to form a flange at a workpiece 1 shaped such as in FIG. 9(a) and making the scheduled stretch flange part 22 the stretch flange part 21, tensile stress is applied to the punched surface 8 (cut surface). The tensile stress becomes largest at the center of the stretch flange part 21.

If the upper blade of the punch is the shape of TYPE-C, at the start of the punching process, only the horizontal part of the upper blade penetrates near the center of the scheduled stretch flange part. At this time, the horizontal part of the upper blade does not have the effect of reduction of load due to a shear angle, so the situation becomes one where the workpiece cannot be easily penetrated, formation of a fracture surface is delayed, and the sheared surface ratio increases. As a result, the work hardening of the workpiece becomes greater. This part becomes a part where tensile stress is applied the most at the time of formation of a flange, so the stretch-flangeability falls.

Furthermore, punches with lengths W of the second inclined part and angles $\theta_1$, $\theta_2$, $\theta_3$ of the first, second, and third inclined parts changed were used for similar punching processes. After punching, the samples were investigated for fracture limit strain. The results are shown in Table 2 and Table 3.

TABLE 2

| Name of shape of punch | Width "w" of second inclined part [mm] | $\theta_1$ ($\theta_3$) [°] | $\theta_2$ [°] | Fracture limit strain |
|---|---|---|---|---|
| TYPE-A-5 | 10.0 | 1.0 | 0.0 | 0.26 |
|  |  |  |  | 0.25 |
| TYPE-A-6 | 5.0 | 1.0 | 0.0 | 0.26 |
|  |  |  |  | 0.25 |
| TYPE-A-7 | 3.0 | 1.0 | 0.0 | 0.20 |
|  |  |  |  | 0.20 |
| TYPE-A-8 | 40.0 | 0.1 | 0.0 | 0.23 |
|  |  |  |  | 0.22 |
| TYPE-A-9 | 40.0 | 5.0 | 0.0 | 0.24 |
|  |  |  |  | 0.25 |
| TYPE-B-5 | 10.0 | 1.0 | 0.0 | 0.25 |
|  |  |  |  | 0.25 |
| TYPE-B-6 | 5.0 | 1.0 | 0.0 | 0.20 |
|  |  |  |  | 0.20 |
| TYPE-B-7 | 3.0 | 1.0 | 0.0 | 0.20 |
|  |  |  |  | 0.20 |
| TYPE-B-8 | 40.0 | 0.1 | 0.0 | 0.23 |
|  |  |  |  | 0.22 |
| TYPE-B-9 | 40.0 | 5.0 | 0.0 | 0.25 |
|  |  |  |  | 0.25 |
| TYPE-C-5 | 10.0 | 1.0 | 0.0 | 0.20 |
|  |  |  |  | 0.20 |
| TYPE-C-6 | 5.0 | 1.0 | 0.0 | 0.20 |
|  |  |  |  | 0.20 |
| TYPE-C-7 | 3.0 | 1.0 | 0.0 | 0.20 |
|  |  |  |  | 0.20 |
| TYPE-C-8 | 40.0 | 0.1 | 0.0 | 0.23 |
|  |  |  |  | 0.23 |
| TYPE-C-9 | 40.0 | 0.5 | 0.0 | 0.21 |
|  |  |  |  | 0.22 |

TABLE 3

| Name of shape of punch | Width "w" of second inclined part [mm] | $\theta_1$ ($\theta_3$) [°] | $\theta_2$ [°] | Fracture limit strain |
|---|---|---|---|---|
| TYPE-A-10 | 40.0 | 1.0 | 0.5 | 0.25 |
|  |  |  |  | 0.25 |
| TYPE-A-11 | 40.0 | 2.0 | 1.0 | 0.24 |
|  |  |  |  | 0.24 |
| TYPE-A-12 | 40.0 | 6.0 | 3.0 | 0.17 |
|  |  |  |  | 0.17 |
| TYPE-A-13 | 40.0 | 0.8 | 0.5 | 0.24 |
|  |  |  |  | 0.24 |
| TYPE-B-10 | 40.0 | 1.0 | 0.5 | 0.25 |
|  |  |  |  | 0.25 |
| TYPE-B-11 | 40.0 | 2.0 | 1.0 | 0.24 |
|  |  |  |  | 0.24 |
| TYPE-B-12 | 40.0 | 6.0 | 3.0 | 0.15 |
|  |  |  |  | 0.15 |
| TYPE-B-13 | 40.0 | 0.8 | 0.5 | 0.24 |
|  |  |  |  | 0.24 |
| TYPE-C-10 | 40.0 | 1.0 | 0.5 | 0.20 |
|  |  |  |  | 0.20 |
| TYPE-C-11 | 40.0 | 2.0 | 1.0 | 0.20 |
|  |  |  |  | 0.20 |
| TYPE-C-12 | 40.0 | 6.0 | 3.0 | 0.15 |
|  |  |  |  | 0.15 |
| TYPE-C-13 | 40.0 | 0.8 | 0.5 | 0.23 |
|  |  |  |  | 0.23 |

From the above results, it will be understood that when looking at the length W of the second inclined part, if W=3.0 mm, the effect of improvement of the fracture limit strain is small and that W≥5.0 mm is preferably satisfied. Further, it will be understood that the effect is obtained even when the angles of the first and third inclined parts are $\theta_1=\theta_3=5.0°$, but when $\theta_1=\theta_3=0.1°$, the effect is small. Further, it will be understood that the angle of the second inclined part preferably satisfies $\theta_2 \leq 1.0°$. Furthermore, it will be understood that if the difference of the angle of the first (third) inclined part and the angle of the second inclined part is small, the effect is small and that $\theta_2 \leq \theta_1/2 (\theta_2 \leq \theta_3/2)$ is preferably satisfied.

Note that, as will be understood from Table 2, in the case of W=5.0 mm, with TYPE-A, the fracture limit strain becomes larger compared with TYPE-B. This is due to the fact that in the case of TYPE-A, the horizontal part penetrates in the state where the inclined parts at the two sides have already penetrated, while in the case of TYPE-B, the horizontal part penetrates in the state where one inclined part remains. As a result, it is believed a difference arises in the range of W in which a high stretch-flangeability can be secured. That is, it will be understood that with TYPE-A, a high stretch-flangeability can be secured over a broader range than TYPE-B and therefore it is superior to TYPE-B.

Figure 10:
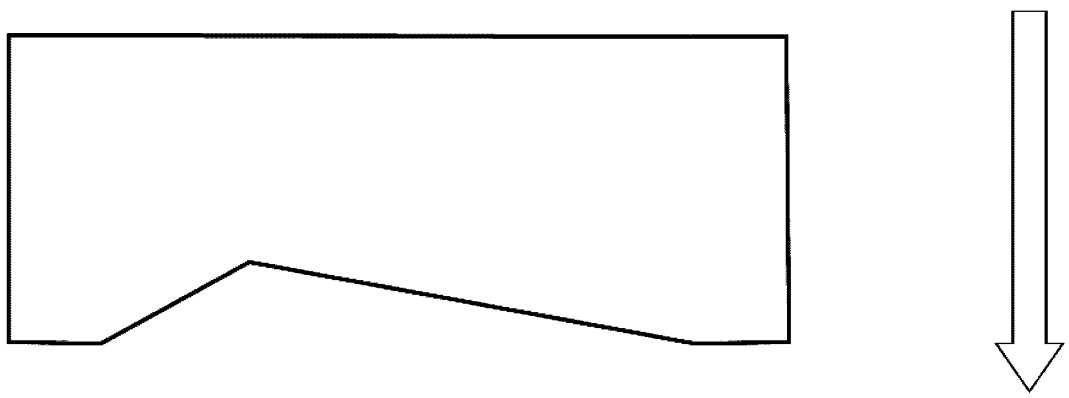
FIG. 10 is a view showing the shape of a punch including horizontal parts at two ends of an upper blade.

Furthermore, a punch shown in FIG. 10 including horizontal parts at the two ends of the upper blade was used to conduct similar tests. As a result of two tests, the fracture limit strains were 0.22 and 0.21. No effect of improvement of fracture limit strain could be seen. This is believed to be because the horizontal parts not having the effect of reduction of load due to the shear angle first penetrated the workpiece.

Next, the steps in a method for judging the shape of the upper blade of a punch will be explained.

The shape of the upper blade of a punch, as illustrated above, has a width of the horizontal part of tens of mm and a shear angle of about 1.0°, so visually judging the shape is extremely difficult. Therefore, a laser displacement meter or a contact type 3D shape measuring apparatus etc. is used to measure the shape of the upper blade, but according to the present invention, the following method is used to simply judge from the measurement data of the shape whether the shape of the upper blade of the punch is a shape suitable for punching.

First, 2D data of the inclined upper blade of the punch measured by a laser displacement meter or a contact type 3D shape measurement apparatus etc. is input. The 2D data is a point cloud $(x_n, y_n)$ (n=1 to k) comprised of "k" sets of cutting line direction positions $(x_n)$ of equal intervals and displacements $(y_n)$ of the upper blade along the direction of movement of the punch corresponding to the $x_n$. $y_n$ is a displacement which is smallest at the position first penetrating the workpiece and becomes larger in value the further away. The position in the direction of movement of the punch where $y_n=0$ may be freely set.

Next, a first-order difference quotient $J1_n=(y_{n+1}-y_n)/\Delta x$ is found for the point cloud $(x_n, y_n)$ (n=2 to k-1).

If an absolute value $|J1_n|$ of the first-order difference quotient $J1_n$ is larger than a predetermined threshold value $\delta_1$ for judgment of a horizontal part, it will be understood that the upper blade between the n-th to n+1-th point of the point cloud is inclined. The threshold value $\delta_1$ can for example be made 0.1. Next, a second order difference quotient $J2_n=(y_{n+1}-2y_n+y_{n-1})/(\Delta x)^2$ is found. Furthermore, a maximum value $J2_{max}$ of the second order difference quotient is found. The maximum value $J2_{max}$ of the second order difference quotient is the maximum value from the second order difference quotients $(y_3-2y_2+y_1)/(\Delta x)^2$ to $(y_k-2y_{k-1}+y_{k-2})/(\Delta x)^2$ found by changing the "n" of the point cloud (x, y).

Next, a type judgment value $J3_n=J2_n/|J2_{max}|$ is found. When an absolute value of $J3_n$ is larger than a threshold value $\delta_2$ for judgment of a type, the n-th point corresponds to the position where the shape of the upper blade changes. The threshold value $\delta_2$ is a value not more than 1 and can be freely set in accordance with need. For example, $\delta_2=0.5$ may be set.

At this time, if the sign of $J3_n$ is negative, the inclined part is a shape inclined downward with respect to the horizontal part (direction close to workpiece) while if the sign of $J3_n$ is positive, the inclined part is a shape inclined upward with respect to the horizontal part (direction far from workpiece). That is, it is possible to judge the direction of inclination of the inclined part from the sign of $J3_n$.

Figure 11:
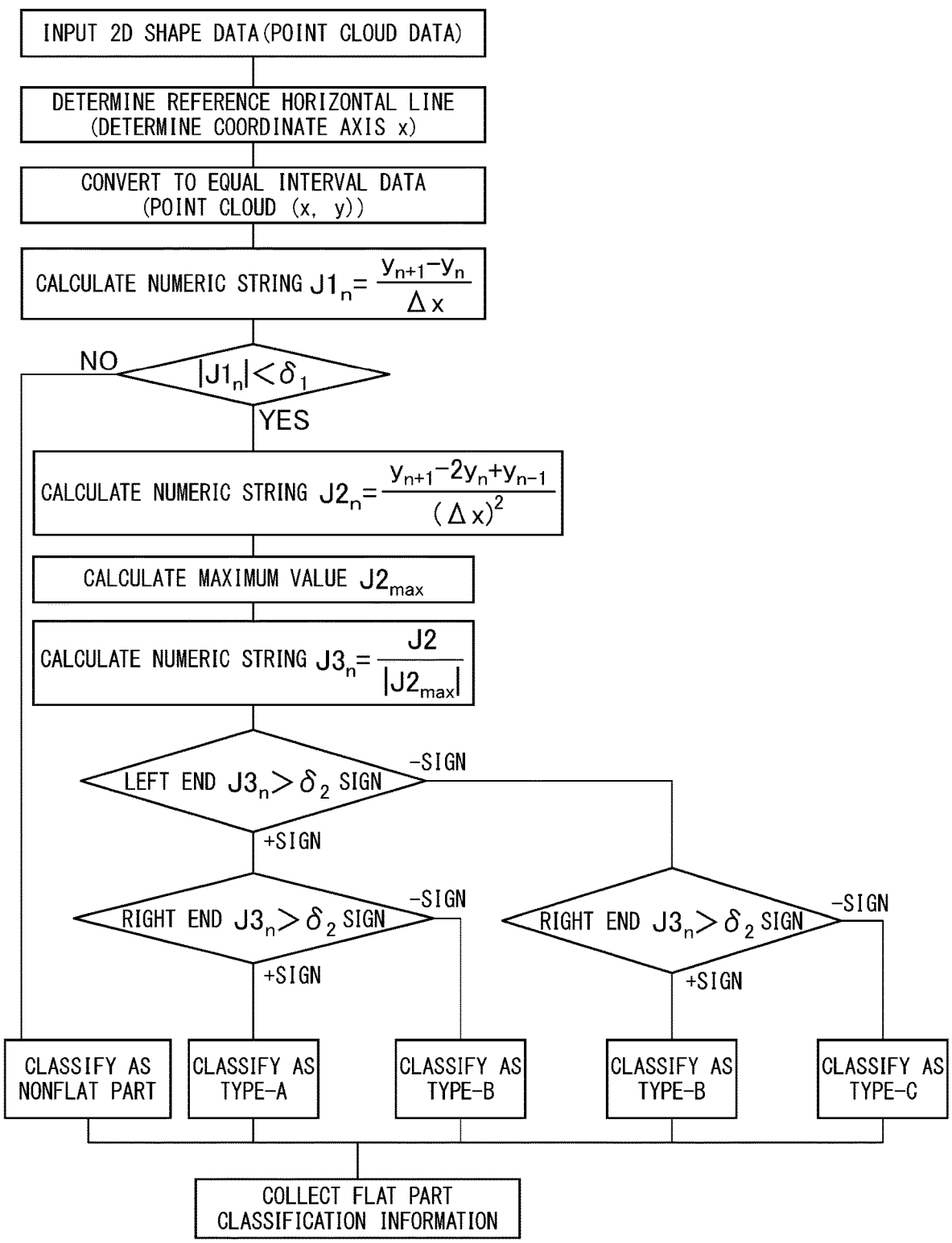
FIG. 11 is a flow chart for judging a type of shape of a punch from 2D shape data of a punch in the present invention.

As explained above, the shape used in the present invention is the shape of TYPE-A such as in FIG. 5(a). That is, if, at one or both of the boundary of the second inclined part and the first inclined part and the boundary of the second inclined part and third inclined part, the absolute value of $J3_n$ is a predetermined threshold value $\delta_2$ or more and $J3_n$ is positive, it is necessary to adjust the shear angle of the upper blade If illustrating a flow chart of this judgment, the result becomes like in FIG. 11. The shape of the punch is judged by making a computer etc. run a program for judging the shape of the upper blade for performing such processing. Specific examples of this judgment are shown in FIGS. 12 to 16.

FIG. 12(a) shows the punch shape (x, y) and $J1_n$, while (b) shows the punch shape (x, y) and $J3_n$. In this example, at the two ends of the horizontal part ($|J|_n|<\delta_1$), there are points where the absolute value of $J3_n$ is larger than $\delta_2$ and the sign of $J3_n$ is negative ($|J3_n|<\delta_2$, $J3_n<0$). In this case, the shape of the punch is judged to be TYPE-A.

In the examples of FIGS. 13 and 14, at one end of the horizontal part ($|J1_n|<\delta_1$), there is a point where the absolute value of $J3_n$ is larger than $\delta_2$ and the sign of $J3_n$ is negative ($|J3_n|<\delta_2$, $J3_n<0$), while at the other end, there is a point where the absolute value of $J3_n$ is larger than $\delta_2$ and the sign of $J3_n$ is positive ($|J2_n|<\delta_2$, $J3_n>0$). In this case, the shape of the punch is judged to be TYPE-B.

In the example of FIG. 15, at the two ends of the horizontal part ($|J1_n|<\delta_1$), there are points where the absolute value of $J3_n$ is larger than $\delta_2$ and the sign of $J3_n$ is positive ($|J3_n|<\delta_2$, $J3_n>0$). In this case, the shape of the punch is judged to be TYPE-C.

The example of FIG. 16 is a mixed pattern of TYPE-A, TYPE-B, and TYPE-C. If the punch is such a shape, it may be considered to use the pattern so that the shapes of TYPE-B and TYPE-C do not face the scheduled stretch flange part where the end face properties of the punched surface most become a problem, but it is preferable to not use this considering the stability of the processing.

In the method of judgment of the present invention, the value of $J3_n$ is stable with respect to changes of the value of $\Delta x$. The absolute values of $J1_n$ and $J2_n$ do not have to be high precision. That is, in the judgment of the shape of the punch by the present algorithm, close examination of $\Delta x$ and study of the effects on $J1_n$ and $J2_n$ in advance are not necessary. It is possible to easily judge the shape of the punch without considering measurement precision.

Note that, a punch judged to be TYPE-B or TYPE-C cannot be used as is, but if working the upper blade to rectify the shear angle and adjusting it to obtain the shape of TYPE-A, it is possible to use it in the same way as a punch judged to be TYPE-A. The upper blade after being worked is judged for shape again using the above method of judgment.

The constituent elements of the punching and shearing device with shear angle 15 used in the present invention will be explained next.

Figure 1:
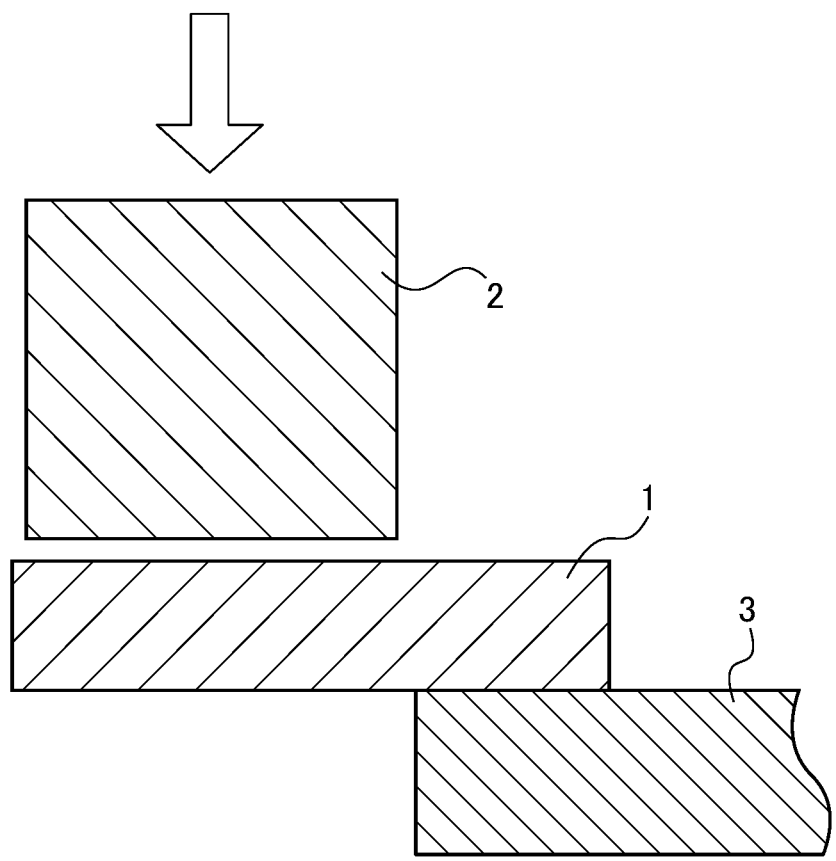
FIG. 1 is a view schematically showing a punching process.
Figure 2:
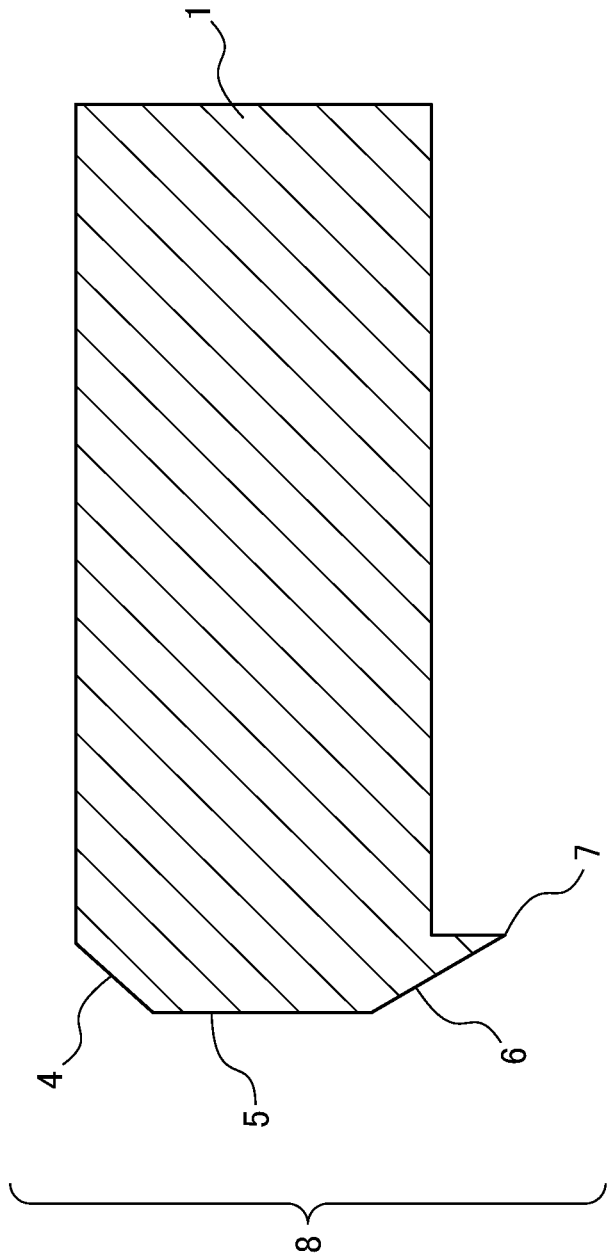
FIG. 2 is a view schematically showing the features of a punched surface 8.
Figure 3:
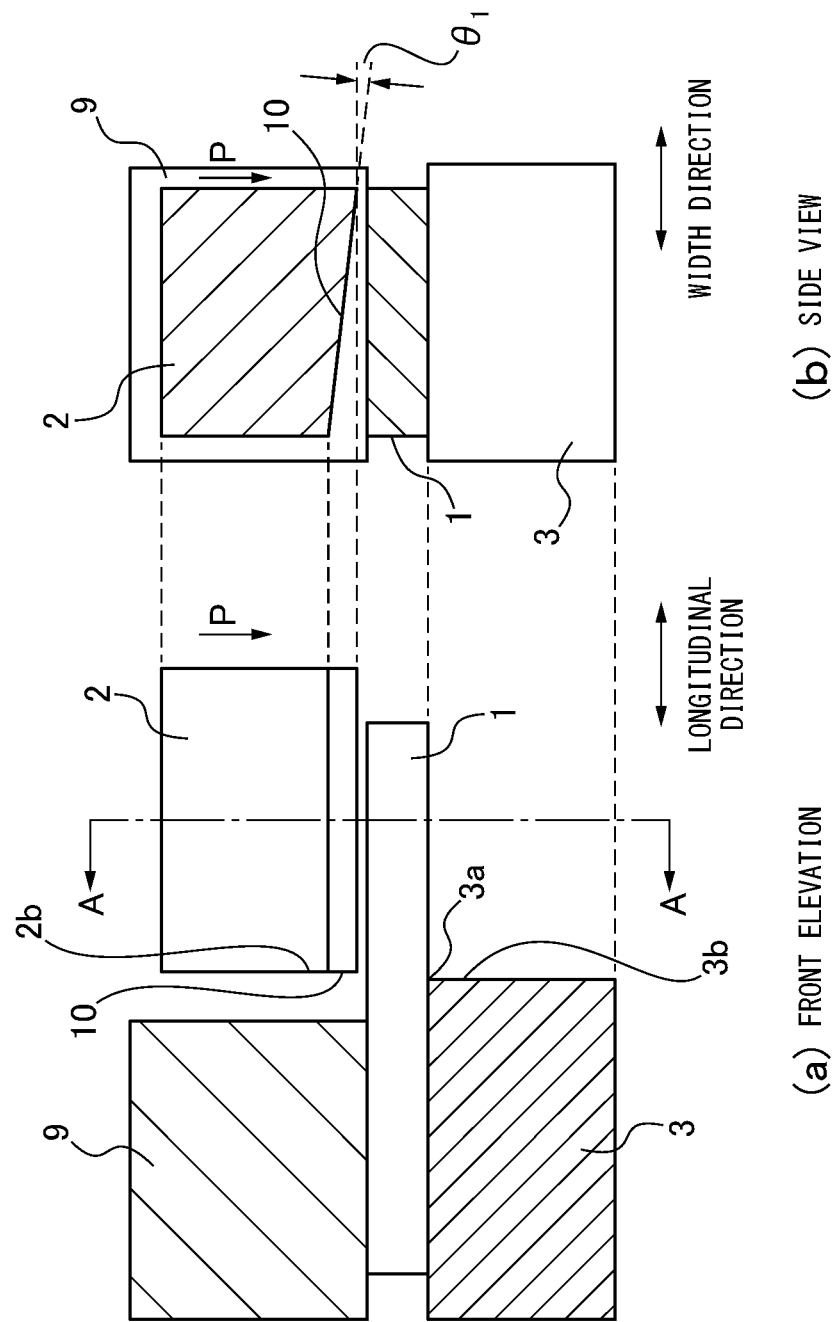
FIG. 3 is a view schematically showing a punching process by a conventional inclined blade, where (a) is a front elevation and (b) is a side view showing a cross-section along the line A-A of (a)
Figure 4:
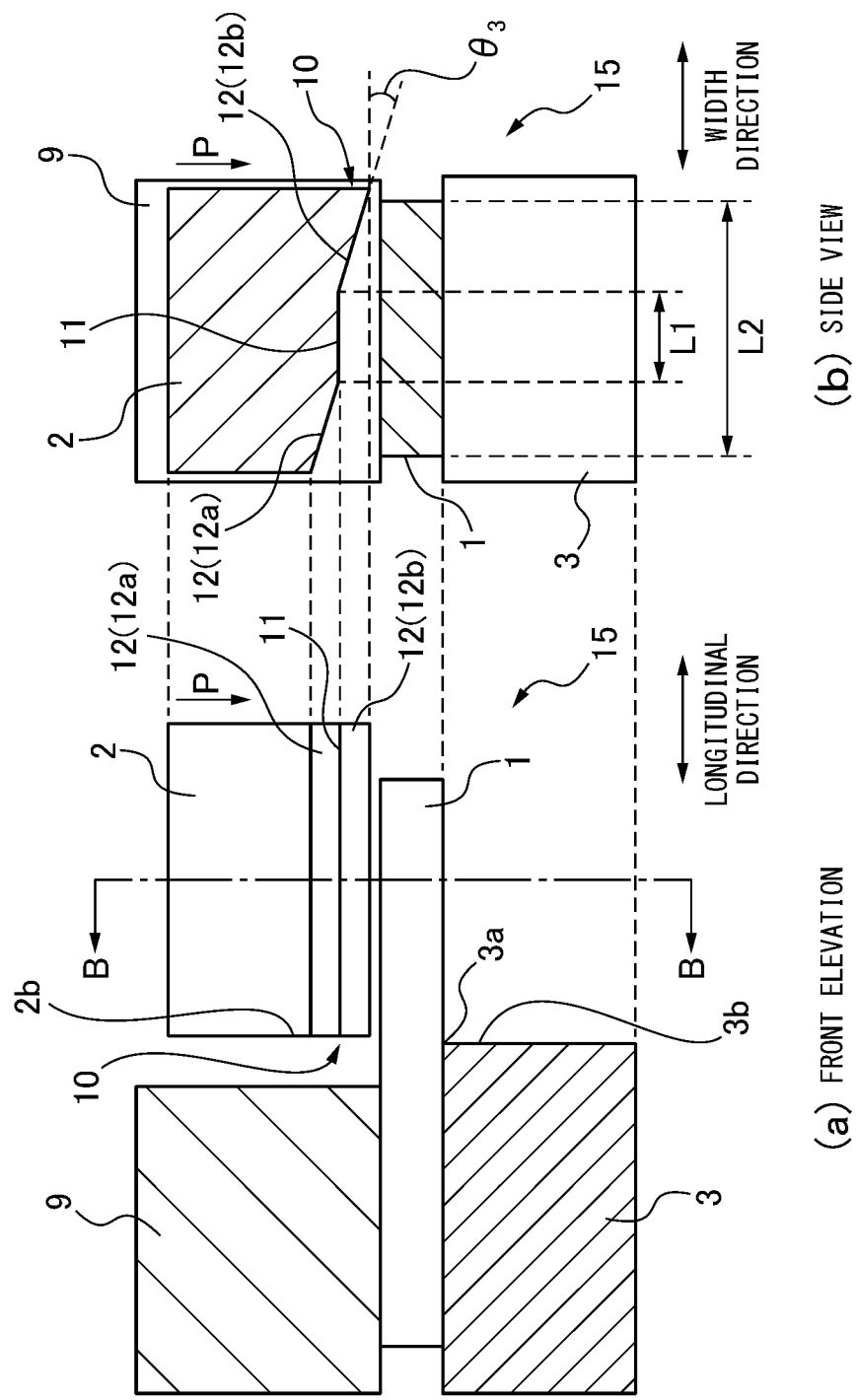
FIG. 4 is a view schematically showing a punching and shearing device applying an inclined blade partially having a horizontal part with respect to a cutting line direction, where (a) is a front elevation and (b) is a side view showing a cross-section along the line B-B of (a).

As shown in FIG. 4, the punching and shearing device with shear angle 15 is provided with at least a punch 2, die 3, and holder 9. The punch 2 is provided with an upper blade 10 at its bottom surface. This upper blade 10 has a first inclined part 12a, second inclined part 11, and third inclined part 12b in the width direction. In FIG. 4, the second inclined part is parallel to the cutting line direction.

The first inclined part 12a and the third inclined part 12b function as so-called "shear angle" parts. In the present invention, the shapes of the first inclined part 12a and third inclined part 12b are as explained above. A shape such as shown in FIG. 5(a) where the two ends (first inclined part and third inclined part) first penetrate the workpiece and finally the center part (second inclined part) penetrates it can be used. Shapes such as shown in (b) and (c) are not used. The punch 2 is configured to be able to operate toward the direction P shown in FIG. 4.

In the die 3, the end part positioned in the longitudinal direction of the top surface functions as a lower blade 3a. Above this lower blade 3a, the upper blade 10 of the punch 2 is positioned. The shapes of the side surface 2b at the bottom end side of the punch 2 and the side surface 3b at the top end side of the die 3 correspond to each other. Between these side surface 2b and side surface 3b, any clearance may be provided. This lower blade 3a may be configured to enable cutting of an open cross-section so as to enable blanking and may be configured to enable cutting of a closed cross-section to enable punching.

The workpiece 1 is placed on the top surface of the die 3. The thus placed workpiece 1 becomes gripped between the top surface of the die 3 and the bottom surface of the holder 9.

Regarding the second inclined part 11 of the upper blade 10, the above-mentioned second inclined part 11 of the punch 2 is preferably arranged at part of the workpiece 1, that is, part or all of the scheduled stretch flange part 22 where the end face properties of the punched surface 8 become the most problematic.

Next, the process of punching the workpiece 1 using the punching and shearing device with shear angle 15 comprised of such a constitution will be explained.

First, as shown in FIG. 4, the workpiece 1 is placed on the die 3, then the workpiece 1 is gripped between the top surface of the die 3 and the bottom surface of the holder 9. After that, the punch 2 having the upper blade 10 is pushed downward as shown by the direction P from above the workpiece 1. After that, a shear force acts on the workpiece 1 due to it being sandwiched between the lower blade 3a and the upper blade 10 whereby the workpiece 1 is cut and is punched to a predetermined shape.

Here, the first inclined part 12a and the third inclined part 12b are inclined in the width direction, so at the time of punching, a punching load is locally applied to the workpiece 1 to cut the workpiece 1. Since a punching load is locally applied, the required punching load can be decreased and further the noise can be reduced compared with a punch 2 with a flat bottom surface and using a flat blade.

As opposed to this, the second inclined part 11 does not locally apply a punching load like the first inclined part 12a and the third inclined part 12b, but the punched surface 8 punched by the small inclination second inclined part 11 is resistant to flexing in the width direction, so the punched surface 8 becomes uniform and the stretch-flangeability is improved. Further, the workpiece 1 is punched by the first inclined part 12a and the third inclined part 12b over a certain extent of range before being punched by the second inclined part 11, so the range which is punched by the second inclined part 11 becomes smaller compared with the punch 2 where the entire bottom surface is flat and as a result, the punching load required can be decreased and the noise can be reduced even when punching by the second inclined part 11.

That is, the punch 2 applying the present invention is provided with the second inclined part 11 at part of the upper blade 10 and with the first inclined part 12a and third inclined part 12b at the parts excluding the second inclined part 11, whereby it becomes possible to decrease the punching load and noise compared with a punch where the entire bottom surface is flat and while further making the punched surface uniform and improving the stretch-flangeability.

The length L1 of the upper blade 10 in the width direction of the second inclined part 11 (cutting line direction) is preferably made 10 to 60% of the length L2 in the width direction of the workpiece 1, more preferably 20 to 50%, still more preferably 30 to 40%.

If the length L1 of the second inclined part 11 is shorter than 10% of the length L2 of the workpiece 1 in the width direction, due to the first inclined part 12a and the third inclined part 12b around the second inclined part 11, the workpiece 1 will more easily flex in the width direction, the unevenness and work hardening of the punched surface 8 will increase, and the effect of the present invention of improvement of the stretch-flangeability will become harder to obtain.

If the length L1 of the second inclined part 11 is greater than 60% of the length L2 of the workpiece 1 in the width direction, since stretch flanging occurs due to the concentration of strain in the width direction (cutting line direction), the effect of the present invention of improvement of the stretch-flangeability will become harder to obtain.

However, these values may fluctuate depending on the working conditions or the material of the workpiece 1. The effects of the present invention cannot necessarily be obtained in all cases if over this range.

If the absolute values $\theta_1$, $\theta_3$ of the angles of the first inclined part 12a and the third inclined part 12b of the upper blade 10 in the width direction applying the present invention are in the range of 0.5 to 5.0°, there is almost no effect on the amount of work hardening or unevenness of the fracture surface at the part punched by the second inclined part 11.

If the absolute values $\theta_1$, $\theta_3$ of the angles of the first inclined part 12a and the third inclined part 12b become more than 5.0°, the effects of lightening the press load and reducing noise become greater, but the punched surface 8 of the part punched by the inclined blade 10 becomes worse in fracture surface properties (work hardening and unevenness of fracture surface). Therefore, it is preferable to make the absolute values $\theta_1$, $\theta_3$ of the angles of the first inclined part 12a and third inclined part 12b 0.5 to 5.0°. Further, $\theta_1$ and $\theta_3$ may differ if within the above range.

In the present invention, the metal sheet forming the workpiece is not particularly limited. A metal sheet made of iron, aluminum, titanium, magnesium and their alloys etc. can be punched. The sheet thickness is also not particularly limited, but the invention is suitable for working 0.5 to 4.0 mm metal sheet. Further, edge cracking in the stretch flanging easily occurs when press-forming high strength steel sheet to obtain press-formed parts, so the invention is particularly effective for working steel sheet with a tensile strength of 590 MPa or more.

Figure 17:
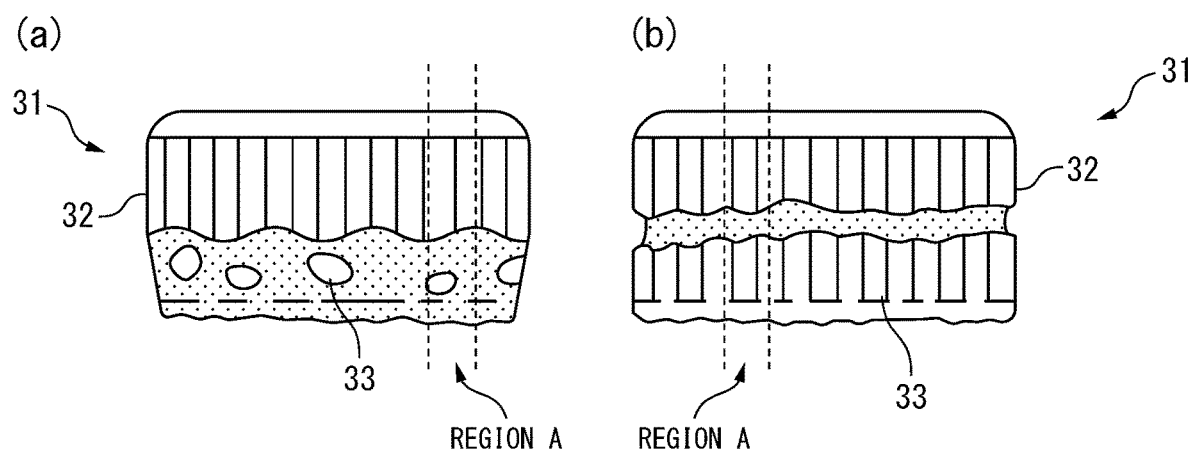
FIG. 17 is a view explaining a sheared surface of a blank obtained by the present invention.

The blank obtained by the above method has a sheared end face 31 such as in FIG. 17. The sheared end face includes a sheared surface 32 and a secondary sheared surface 33. The secondary sheared surface 33 sometimes becomes a shape split like in (a) and sometimes becomes a shape continuous like in (b).

At the sheared end face 31, if the area ratio of the secondary sheared surface 33 of the entire range of the sheared end face 31 is A2 and the center value of the radius of curvature of the entire range of the blank line when viewed from the top is R, there is a region A of a width of 5 mm surrounded by the two vertical lines drawn in the thickness direction in the sheared end face 31 where the area ratio of the secondary sheared surface 33 at that region A is A2/2 or less and radius of curvature of the region A when viewed from the top is ½ or less of R. Here, the radius of curvature of the blank line when viewed from the top is made one found for every 1 mm from the end of the blank line. The radius of curvature in the case where the blank line is straight is ∞. The region A in the figure is for explaining the range of the region A.

If there is a secondary sheared surface 33 present at the sheared end face 31 of the blank, the stretch-flangeability of the blank will easily fall. If the ratio of the secondary sheared surface 33 is large, the drop will become remarkable. If the ratio of the secondary sheared surface 33 at a region with a small radius of curvature of the blank line, that is, a location where deformation concentrates, becomes lower, the stretch-flangeability can be kept from dropping.

Further, the area ratio of the sheared surface 32 at the region A is preferably not more than 80% of the area ratio of the sheared end face 31 other than the region A, more preferably not more than 70%, still more preferably not more than 60%.

Further, if the ratio of the sheared surface 32 is uneven as well, the stretch-flangeability easily drops, so the change in the area ratio of the sheared surface 32 in the sheet width direction of the region A is preferably within ±20%. The change in the area ratio of the sheared surface 32 in the sheet width direction of the region A is obtained by finding the area ratio of the sheared surface 32 for each 1 mm from the end of the region A and finding the change of the same. The change of the sheared surface 32 is more preferably within ±15%, still more preferably within ±10%.

The larger such a width of the region A, the more preferable. It is more preferable to satisfy the above condition by a width of 7 mm and still more preferable to satisfy the above condition by a width of 10 mm.

REFERENCE SIGNS LIST 1 workpiece
2 punch
3 die
3a lower blade
4 shear droop
5 shear surface
6 fracture surface
7 burr
8 punched surface
9 holder
10 upper blade
11 second inclined part
12a first inclined part
12b third inclined part
15 punching and shearing device
21 stretch flange part 22 scheduled stretch flange part
31 sheared end face
32 sheared surface
33 secondary sheared surface

The invention claimed is:

1. A method for producing a blank by using a punching and shearing device having a punch having an upper blade and a die having a lower blade,
   the upper blade comprising a first inclined part, second inclined part, and third inclined part provided in that order in a cutting line direction of the metal sheet,
   an angle $\theta_1$ of the first inclined part with respect to the metal sheet in the cutting line direction, an angle $\theta_2$ of the second inclined part with respect to the metal sheet in the cutting line direction, and an angle $\theta_3$ of the third inclined part with respect to the metal sheet in the cutting line direction satisfying $\theta_2 \leq \theta_1/2$ and $\theta_2 \leq \theta_3/2$, and at the time of the punching, the first inclined part and the third inclined part contacting the metal sheet, then the second inclined part contacting the metal sheet, wherein,
   in a point cloud $(x_n, y_n)$ of the shape of the upper blade comprising sets of cutting line direction positions $(x_n)$ and displacements $(y_n)$ of the upper blade along the direction of movement of the punch corresponding to the $x_n$ in a direction away from the metal sheet,
   a second order difference quotient $J2_n=(y_{n+1}-2y_n+y_{n-1})/(\Delta x)^2$, a maximum value $J2_{max}$ of the second order difference quotient, and $J3_n=J2_n/|J2_{max}|$ are defined, a first point where an absolute value of a type judgement value $J3_n$ becomes a predetermined threshold value $\delta_2$ or more is a boundary position of the first inclined part and the second inclined part, and a last point is a boundary position of the second inclined part and the third inclined part, and
   wherein the predetermined threshold value $\delta 2$ is 0 or more and not more than 1, and $\theta_1$, $\theta_2$, and $\theta_3$ mean respectively the average values of the maximum values and minimum values of the angles formed with the metal sheet by tangents at any points of the first inclined part, the second inclined part, and the third inclined part,
   the method comprising:
   producing the blank, using the punching and shearing device having the punch having the upper blade and the die having the lower blade, by punching the metal sheet placed between the punch and the die.

2. The method for producing a blank according to claim 1, wherein the angle $\theta_2$ of the second inclined part with respect to the metal sheet in the cutting line direction satisfies $\theta_2 \leq 3.0°$.

3. The method for producing a blank according to claim 1, wherein the method comprises before the punching, a step of judging a shape of the upper blade before stamping and a step of adjusting a shear angle of the upper blade based on the result of judgment of the shape of the upper blade.

4. A method for producing a press-formed part comprising press-forming a blank obtained by the method according to claim 1 to obtain a press-formed part.

5. A method for judging a shape of an upper blade used in the method according to claim 3,
   the method for judging a shape comprising
   a step of inputting a point cloud $(x_n, y_n)$ of the shape of the upper blade comprised of sets of cutting line direction positions $(x_n)$ and displacements $(y_n)$ of the upper blade along the direction of movement of the punch corresponding to the $x_n$ in a direction away from the metal sheet,
   a step of calculating a first-order difference quotient $J1_n=(y_{n+1}-y_n)/\Delta x$ for the input point cloud $(x_n, y_n)$,
   a step of calculating a second order difference quotient $J2_n=(y_{n+1}-2y_n+y_{n-1})/(\Delta x)^2$,
   a step of calculating a maximum value $J2_{max}$ of the second order difference quotient,
   a step of calculating a type judgment value $J3_n=J2_n/|J2_{max}|$, and
   a step of judging it is necessary to adjust a shear angle of the upper blade if an absolute value $J3_n$ is a predetermined threshold value $\delta_2$ or more and $J3_n$ is positive at one or both of a boundary of the second inclined part and the first inclined part and a boundary of the second inclined part and the third inclined part,
   wherein the predetermined threshold value $\delta 2$ is 0 or more and not more than 1.

6. A program for judging a shape of an upper blade used in the method according to claim 3,
   the program executing
   a step of inputting a point cloud $(x_n, y_n)$ of the shape of the upper blade comprised of sets of cutting line direction positions $(x_n)$ and displacements $(y_n)$ of the upper blade along the direction of movement of the punch corresponding to the $x_n$ in a direction away from the metal sheet,
   a step of calculating a first-order difference quotient $J1_n=(y_{n+1}-y_n)/\Delta x$ for the input point cloud $(x_n, y_n)$,
   a step of calculating a second order difference quotient $J2_n=(y_{n+1}-2y_n+y_{n-1})/(\Delta x)^2$,
   a step of calculating a maximum value $J2_{max}$ of the second order difference quotient,
   a step of calculating a type judgment value $J3_n=J2_n/|J2_{max}|$, and
   a step of judging it is necessary to adjust a shear angle of the upper blade if an absolute value $J3_n$ is a predetermined threshold value $\delta_2$ or more and $J3_n$ is positive at one or both of a boundary of the second inclined part and the first inclined part and a boundary of the second inclined part and the third inclined part,
   wherein the predetermined threshold value $\delta 2$ is 0 or more and not more than 1.

7. An apparatus for producing a blank used in the method according to claim 3,
   the apparatus comprising
   an input unit for inputting a point cloud $(x_n, y_n)$ of the shape of the upper blade comprised of sets of cutting line direction positions $(x_n)$ and displacements $(y_n)$ of the upper blade along the direction of movement of the punch corresponding to the $x_n$ in a direction away from the metal sheet,
   a first calculating part for calculating a first-order difference quotient $J1_n=(y_{n+1}-y_n)/\Delta x$ for the input point cloud $(x_n, y_n)$,
   a second calculating part for calculating a second order difference quotient $J2_n=(y_{n+1}-2y_n+y_{n-1})/(\Delta x)^2$,
   a third calculating part for calculating a maximum value $J2_{max}$ of the second order difference quotient,
   a fourth calculating part for calculating a type judgment value $J3_n=J2_n/|J2_{max}|$, and
   a judging part for judging it is necessary to adjust a shear angle of the upper blade if an absolute value $J3_n$ is a predetermined threshold value $\delta_2$ or more and $J3_n$ is positive at one or both of a boundary of the second inclined part and the first inclined part and a boundary of the second inclined part and the third inclined part, wherein the predetermined threshold value δ2 is 0 or more and not more than 1.

8. A blank having a sheared end face comprising a region A of a width of 5 mm surrounded by two vertical lines drawn in the thickness direction in the sheared end face, the area ratio of the secondary sheared surface at that region A being $A_2/2$ or less, the radius of curvature of the region A in a top view being ½ or less of R,
wherein $A_2$ means an area ratio of a secondary sheared surface of an entire range of a sheared end face, and R means a center value of a radius of curvature of an entire range of a blank line in a top view.

9. The blank according to claim 8, wherein the area ratio of the sheared surface at the region A is not more than 80% of the area ratio of the sheared end face at the region excluding the region A from the entire range of the sheared end face.

10. The blank according to claim 8, wherein a change in the area ratio of the sheared surface in the sheet width direction of the region A is within ±20%.

11. The method for producing a blank according to claim 2, wherein the method comprises before the punching, a step of judging a shape of the upper blade before stamping and a step of adjusting a shear angle of the upper blade based on the result of judgment of the shape of the upper blade.

12. A method for producing a press-formed part comprising press-forming a blank obtained by the method according to claim 2 to obtain a press-formed part.

13. A method for producing a press-formed part comprising press-forming a blank obtained by the method according to claim 3 to obtain a press-formed part.

14. The blank according to claim 9, wherein a change in the area ratio of the sheared surface in the sheet width direction of the region A is within ±20%.

* * * * *